United States Patent
Sun

(10) Patent No.: US 8,145,839 B2
(45) Date of Patent: Mar. 27, 2012

(54) RAID_5 CONTROLLER AND ACCESSING METHOD WITH DATA STREAM DISTRIBUTION AND AGGREGATION OPERATIONS BASED ON THE PRIMITIVE DATA ACCESS BLOCK OF STORAGE DEVICES

(75) Inventor: Zhi-Ming Sun, Hsinchu (TW)

(73) Assignee: JMicron Technology Corp., Science-Based Industrial Park, Hsin-Chu (TW)

( * ) Notice: Subject to any disclaimer, the term of this patent is extended or adjusted under 35 U.S.C. 154(b) by 521 days.

(21) Appl. No.: 12/402,491

(22) Filed: Mar. 11, 2009

(65) Prior Publication Data

US 2009/0287882 A1  Nov. 19, 2009

(30) Foreign Application Priority Data

May 13, 2008 (TW) .............................. 97117608 A

(51) Int. Cl.
*G06F 12/00* (2006.01)
*G06F 11/00* (2006.01)

(52) U.S. Cl. ...................... 711/114; 714/6.21; 714/6.22

(58) Field of Classification Search .................. 711/114, 711/E12.103; 714/6.21, 6.22
See application file for complete search history.

(56) References Cited

U.S. PATENT DOCUMENTS

| 6,529,994 B1 * | 3/2003 | Bleidt et al. .................. 711/114 |
| 7,032,069 B2 | 4/2006 | Kitamura |
| 7,213,102 B2 | 5/2007 | Buchanan |
| 7,308,602 B2 * | 12/2007 | Dandrea ...................... 714/6.24 |
| 2005/0097388 A1 * | 5/2005 | Land ................................ 714/5 |

FOREIGN PATENT DOCUMENTS

| TW | 579503 | 3/2004 |
| TW | 200727167 | 7/2007 |
| TW | 1289759 | 11/2007 |

* cited by examiner

*Primary Examiner* — Kevin Ellis
*Assistant Examiner* — Mehdi Namazi
(74) *Attorney, Agent, or Firm* — Winston Hsu; Scott Margo

(57) ABSTRACT

By taking advantage of parallel data processing and transmission techniques, the data access rate of a redundant array of independent disks (RAID) level 5 can be boosted significantly. A data distribution and aggregation unit is utilized to distribute a data stream into a plurality of data sub-streams based on the primitive data access block of storage devices as a processing unit of data writing, or to aggregate a plurality of data sub-streams to form a data stream based on the primitive data access block of storage devices as a processing unit of data reading. An exclusive OR operation unit capable of parallel data processing is introduced for performing data processing on the plurality of data sub-streams simultaneously. The data transmission of each data sub-stream is controlled individually by one of a plurality of transmission controllers.

26 Claims, 12 Drawing Sheets

RAID_5 CONTROLLER AND ACCESSING METHOD WITH DATA STREAM DISTRIBUTION AND AGGREGATION OPERATIONS BASED ON THE PRIMITIVE DATA ACCESS BLOCK OF STORAGE DEVICES

BACKGROUND OF THE INVENTION

1. Field of the Invention

The present invention relates to a RAID controller and access methods thereof, especially a RAID_5 controller and access methods thereof with data stream distribution and aggregation operations based on the primitive data access block of storage devices.

2. Description of the Prior Art

Along with the increasing data amount for processing and the trend of data digitalization, how to build a storage system with high availability, high performance, and high volume is one of the most important topics nowadays. In present computer systems, RAID (Redundant Array of Independent Disks) systems are one of the storage systems most commonly used, capable of offering the host entity storage space of high availability, high performance, and high volume.

Categorized by the operating modes, the RAID level can be divided into level 0, 1, 2, 3, 4, 5, or 6. For a less complicated system, RAID level 0 and 1 are mainly used. However, RAID_0 system does not have the ability of fault tolerance, and stores data separately among the disk array; if there is any one hard disk broken, the stored data will loss accordingly. RAID_1 system stores data in two hard disks simultaneously, in other words, if there is one hard disk broken, the data can be retrieved from the other hard disk, and after the broken one is replaced by a new hard disk, the new hard disk can backup the data from the other hard disk. Although RAID_1 system affords a mechanism for data protection, the availability rate of the storage space in the RAID_1 system is only 50%.

Generally speaking, the RAID_5 system has both advantages of data protection and high availability rate of the storage space. Similar to the RAID_4 system utilizing an additional parity disk to store parity related information, the RAID_5 system stores parity information separately in different hard disks of the disk array instead of utilizing an additional parity disk.

Please refer to FIG. 1. FIG. 1 is a functional block diagram of a RAID_5 system 100 according to the prior art. The RAID_5 system 100 includes a RAID_5 controller 110 coupled to a host 101, a disk array 170 coupled to the RAID_5 controller 110. The disk array 170 includes a plurality of hard disks 181, 182, 183, 184, and 185, the RAID_5 controller 110 includes a CPU 130, a memory 120 coupled to the CPU 130, and a data access controller 140 coupled to both the memory 120 and the CPU 130. The RAID system 100 has to go through a RAID creation process to define the disk array 170 first, which is then represented to the host 101. After that, the disk array 170 becomes available to the host 101, and the host 101 can access the data in the disk array 170.

During the access operation of the RAID_5 system 100 of the prior art, when there are the data to be written in, the data should be stored in the memory 120 first, and wait for the analysis of the stages of the storage region intended to be written in performed by the CPU 130 so as to execute the reading process to the corresponding data. Afterwards, the CPU 130 executes the exclusive OR (XOR) operation to generate the parity data according to the data intended to be written in coordination with the read-out data, then stores the data intended to be written in and the parity data separately into different hard disks of the disk array. However, if there is an invalid hard disk, and the data of the invalid hard disk are included in the data needed for the parity data operation, the data of the invalid hard disk should be recovered first.

When reading data, the data transmitted from each hard disk is stored into the memory 120, and if there is no invalid hard disk, the CPU 130 will execute a discarding process on the parity data, and combine all the wanted data to generate the output data; if there is an invalid hard disk, the CPU 130 executes a recovering process on the corresponding data of the invalid hard disk, that is the CPU 130 executes the discarding process on the parity data and combines all the wanted data to generate the output data after executing the XOR operation on the data of the other hard disks to recover the data of the invalid hard disk.

Since so far, most RAID_5 systems are structured in a computer structure, or structured through I/O processors, it is the so-called "a software disk array". However, due to the limitation of the structure, the unit of the data sub-streams is ranged from 4 KB to 256 KB, or more, in order to enhance the efficiency of the RAID_5 system, resulting in a very complicated determination and operation procedure while executing the access operation on the boundaries of the storage region intended to be processed.

SUMMARY OF THE INVENTION

The main purpose of the present invention is based on the primitive data access block of storage devices as a unit of data distribution and aggregation to simplify the determination and operation procedures while executing the access operation on the boundaries of the storage region to be processed, and to enhance the access efficiency of a RAID_5 system through hardware speeding.

The present invention releases a RAID_5 controller with data stream distribution and aggregation operations based on the primitive data access block of storage devices, comprising a unit of data distribution and combination, an XOR operation unit, a plurality of transmission controllers, a plurality of access controllers of the storage devices, and a plurality of data registers. The unit of data distribution and combination is employed to distribute a write-in data stream into a plurality of write-in data sub-streams based on the primitive data access block of storage devices as a processing unit. Also, the unit of data distribution and combination is employed to aggregate a plurality of read-out data sub-streams into a read-out data stream based on the primitive data access block of storage devices as a processing unit. The XOR operation unit is coupled to the unit of data distribution and combination. Each transmission controller is coupled to the XOR operation unit. Each data register is coupled between a corresponding transmission controller and a corresponding access controller of the storage device. Each access controller of the storage device is coupled to a corresponding transmission controller and a corresponding storage device.

The present invention further releases a reading method for a RAID_5 system based on an aggregation operation of a primitive data access block of storage devices for reading out a read-out data stream from a plurality of storage devices according to a read command, comprising steps of decoding the read command to generate a corresponding control command of a reading procedure according to stages of a plurality of flag registers; executing an operation of data reading corresponding to a plurality of normal storage devices to generate a plurality of read-out data sub-streams according to the control command of the reading procedure and the stages of the plurality of flag registers; transmitting the read-out data sub-streams in parallel to an XOR operation unit; the XOR operation unit controlling XOR operations corresponding to the plurality of read-out data sub-streams, and then transmitting a plurality of processed read-out data sub-streams in parallel to a unit for data distribution and combination according to the control command of the reading procedure and the stages of the plurality of flag registers; and the unit of data distribution and combination aggregating the plurality of read-out data sub-streams into the read-out data stream based on the primitive data access block of storage devices as an aggregation unit according to the control command of the reading procedure and the stages of the plurality of flag registers.

The present invention further releases a writing method for a RAID_5 system based on an aggregation operation of a primitive data access block of storage devices for writing a write-in data stream into a plurality of storage devices according to a write command, comprising steps of decoding the write command to generate a corresponding control command of a writing procedure according to stages of a plurality of flag registers; distributing the write-in data stream into a plurality of write-in data sub-streams based on a primitive data access block of storage devices as a distribution unit by a unit of data distribution and combination according to the control command of the writing procedure and the stages of the plurality of flag registers, and transmitting the plurality of write-in data sub-streams in parallel to an exclusive OR (XOR) operation unit; the XOR operation unit controlling the XOR operations corresponding to the plurality of write-in data sub-streams, and then transmitting a plurality of processed write-in data sub-streams in parallel to a plurality of access controllers of storage devices corresponding to a plurality of normal storage devices according to the control command of the writing procedure and the stages of the plurality of flag registers; and the plurality of access controllers of storage devices writing the plurality of write-in data sub-streams into the plurality of normal storage devices.

These and other objectives of the present invention will no doubt become obvious to those of ordinary skill in the art after reading the following detailed description of the preferred embodiment that is illustrated in the various figures and drawings.

DETAILED DESCRIPTION

In order to give an overall understanding of the purpose, characteristics, and advantages of the present invention, the article listed below illustrates the RAID_5 controller and accessing method thereof of the present invention through embodiments and attached drawings. However, the illustrated embodiments are not meant to limit the scope of the present invention, and the numbers of the steps in the flow chart are also not meant to limit the executing order of the present invention, any method having the recombination of the order of the steps capable of performing the same result is within the scope of the present invention.

Figure 1:
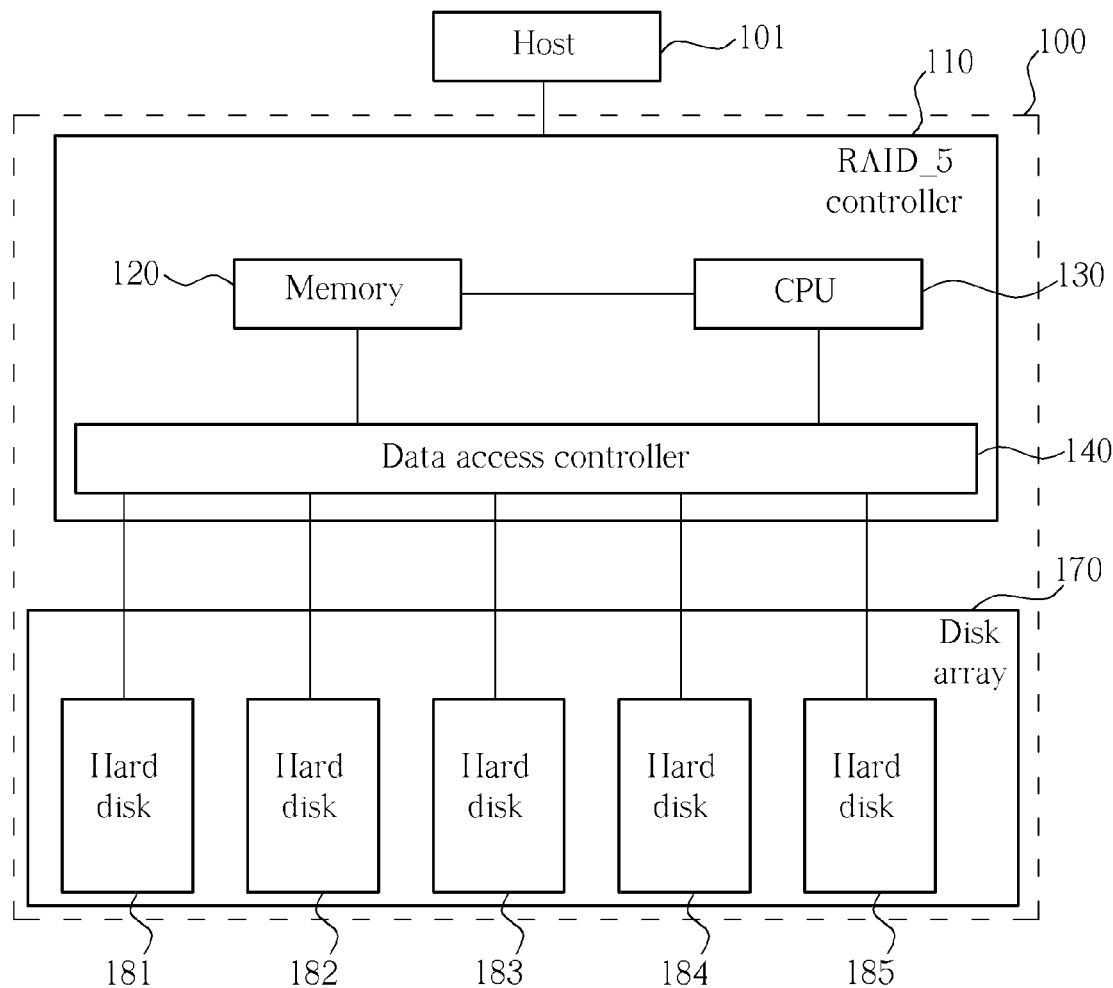
FIG. 1 is a functional block diagram of a RAID_5 system according to the prior art.
Figure 2:
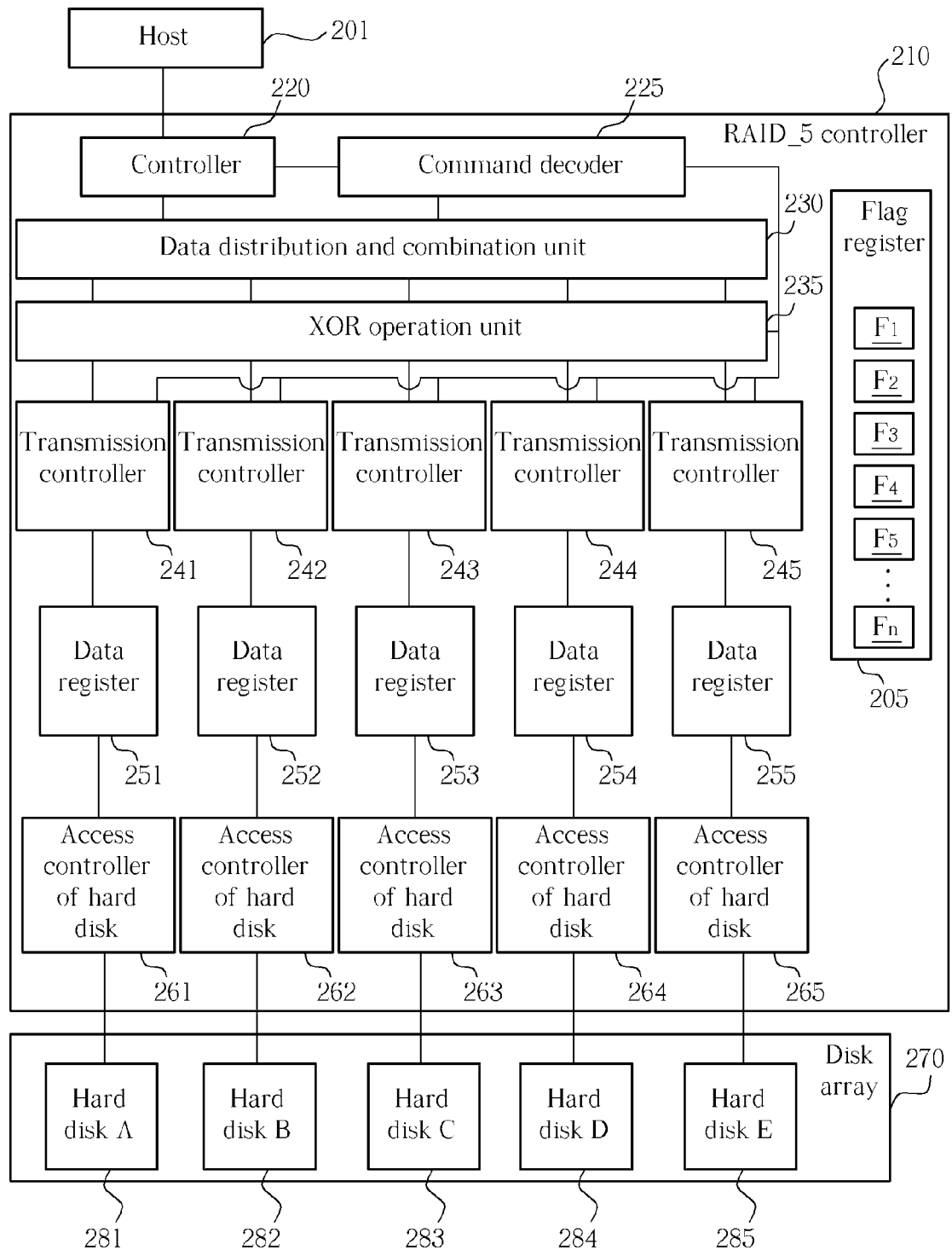
FIG. 2 is a functional block diagram of a RAID_5 controller according to an embodiment of the present invention.

Please refer to FIG. 2. FIG. 2 is a functional block diagram of a RAID_5 controller 210 according to an embodiment of the present invention. The RAID_5 controller 210 is coupled to a host 201 and a disk array 270; the disk array 270 includes hard disks A281, B282, C283, D284, and E285. These hard disks can be SATA hard disks, SAS hard disks, SSDs (Solid State Drives), or storage devices based on double data rate random access memories such as i-RAM. The RAID_5 controller 210 includes a controller 220, a command decoder 225 coupled to the controller 220, a data distribution and combination unit 230 coupled to the controller 220 and the command decoder 225, an XOR operation unit 235 coupled to the data distribution and combination unit 230 and the command decoder 225, a plurality of transmission controllers 241-245 coupled to the XOR operation unit 235 and the command decoder 225, a plurality of data registers 251-255 coupled to the corresponding transmission controller, a plurality of access controllers of hard disks 261-265 coupled to the corresponding data register, and a flag register 205.

As shown in FIG. 2, each access controller of the hard disk coupled to a corresponding hard disk in the disk array 270, for example the access controller of the hard disk 261 is coupled to the hard disk A281, the access controller of the hard disk 265 is coupled to the hard disk E285, and the rest can be deduced by analogy. The disk array 270 in FIG. 2 as an exemplary embodiment is composed of 5 hard disks, however, the number of 5 is not meant to limit the number of hard disks controlled by the RAID_5 controller of the present invention, any disk array controlled by a conventional RAID_5 controller which can be deduced from the RAID_5 controller 210 shown in FIG. 2 can improve the efficiency of data access as well. In addition, each access controller of the hard disk is coupled to the corresponding hard disk through a serial ATA (Serial Advanced Technology Attachment, SATA) interface, a USB (Universal Serial Bus) interface, an SAS (Serial Attached Small Computer System Interface, Serial Attached SCSI) interface, an IEEE-1394 interface, or an eSATA interface.

The controller 220 transmits the access command sent from the host 201 to the command decoder 225, and deals with the dual-directional data transmission between the host 201 and the data distribution and combination unit 230. The flag register 205 includes a plurality of flag registers F1-Fn representing the system stages, for example the flag register F1 represents the stages of the hard disk A281, when the logic value in the flag register F1 is "0", it represents the hard disk A281 is in a normal stage; when the logic value in the flag register F1 is "1", it represents the hard disk A281 is in an invalid stage, and the rest can be deduced by analogy.

The command decoder 225 decodes the control commands of the operations of data access according to the system stages represented in the flag registers F1-Fn (for example the normal or invalid stage of each hard disk) and the access parameters given by the access command (for example read or write, the size of data, and the access address). The control commands of the operations of data access control the operation procedures of each functional circuitry in the system, or give operating parameters according to the stages of storage blocks in a storage region intended to be accessed (for example whether the storage block is a parity storage block or not, or whether the storage block is disposed on the upper boundary or the lower boundary of the storage region). For example the control commands of the operations of data access control the data transmission between each transmission controller 241-245 and the XOR operation unit 235, or give each access controller of the hard disk 261-265 operation parameters for executing a reading or writing operation on the corresponding hard disk. The XOR operation unit 235 executes the corresponding operations according to the decoded control commands of the operations of data access, for example the data transmission, the XOR operation to generate the parity data, or the XOR operation to recover the data stored in an invalid hard disk. The transmission controllers 241-245 can transmit the corresponding data according to the control command of the operations of data access in coordination with the XOR operation unit 235, or can transmit the corresponding data directly according to each system stage represented in flag registers F1-Fn, for example cease the data transmission corresponding to an invalid hard disk. The data registers 251-255 are for storing the data intended to be read out or written in temporarily during the processing of data streams. The access controllers of hard disks 261-265 are for executing the operations of data access to the hard disks A281-E285 respectively. Please notice that in this article, a "storage block" is defined as a primitive data access unit of storage devices. For the embodiment utilizing the present hard disk as a storage device in FIG. 2, a "storage block" is a sector capable of being accessed through an access address, hence, the access controllers of hard disks 261-265 execute the operation of data access on the corresponding hard disks A281-E285 based on a sector as a basic data-access unit. In addition, during the data processing period, no matter data distribution, data aggregation (combination), or executing the XOR operation, a "storage block" is used as an operating unit as well.

The operation principle of data reading of the RAID_5 controller 210 described below is given a rough idea for illustration. When the hard disk A281 is invalid, the command decoder 225 decodes the control command of the corresponding reading procedure according to the logic value "1" represented in the flag register F1 after receiving the read command transmitted from the controller 220. The operation procedures controlled by the control command of the reading procedure include the operation of data reading to the normal hard disks B282-E285 performed by the access controllers of hard disks 262-265 to generate a plurality of read-out data sub-streams, the prohibition of the access controller of the hard disk 261 executing the operation of data reading on the invalid hard disk A281, the temporary storage of the plurality of the read-out data sub-streams read out from the normal hard disks B282-E285 in the data registers 252-255, the transmission of the read-out data sub-streams stored in the data registers 252-255 to the XOR operation unit 235 in parallel performed by the transmission controllers 242-245, and the XOR operation on the read-out data sub-streams executed by the XOR operation unit 235 in order to recover the read-out data sub-stream intended to be read out originally from the hard disk A281. In other words, the transmission controller 241 does not execute the data transmission according to the invalid stage of the hard disk A281, the XOR operation unit 235 replaces the read-out data sub-stream intended to be received from the transmission controller 241 with the recovered read-out data sub-stream, and then transmits the recovered read-out data sub-stream and the 4 read-out data sub-streams already being read out to the data distribution and combination unit 230 through 5 parallel transmission channels, the wanted read-out data are combined into a read-out data stream orderly based on the storage block as a processing unit after the data distribution and combination unit 230 discards the parity data in the 5 read-out data sub-streams inputted from these 5 parallel transmission channels, and then transmitted to the host 201 through the controller 220.

In the aforementioned operation principle of data reading of the RAID_5 controller 210, the processing of data read out from the hard disks to be combined into a data stream is serial processing performed in parallel, and then directly in concourse at last. As a result, compared with the prior art, the RAID_5 controller 210 of the present invention offers a more efficient method in data reading.

The operation principle of data writing of the RAID_5 controller 210 described below is given a rough idea for illustration. When the hard disk A281 is invalid, the command decoder 225 decodes the control command of the corresponding writing procedure according to the logic value "1" represented in the flag register F1 after receiving the write command transmitted from the controller 220. The operation procedures controlled by the control command of the writing procedure include: the data distribution and combination unit 230 receiving a write-in data stream from the host 201 through the controller 220, distributing the data of the write-in data stream into 5 write-in data sub-streams based on the storage block as a processing unit, and then transmitting these 5 write-in data sub-streams to the XOR operation unit 235 in parallel, the XOR operation unit 235 generating the parity data corresponding to the normal hard disks B282-E285. In other words, the XOR operation unit 235 executes the XOR operation to generate the parity data intended to be stored in the normal hard disks B282-E285 according to the 5 write-in data sub-streams inputted in parallel, and inserts the parity data into the corresponding write-in data sub-stream based on the storage block as a processing unit, then transmits the 4 write-in data sub-streams corresponding to the normal hard disks B282-E285 to the access controllers of hard disks 262-265 in parallel through the transmission controllers 242-245 and the data registers 252-255, finally the access controllers of hard disks 262-265 write the corresponding write-in data sub-streams into the normal hard disks B282-E285.

From the aforementioned operation principle of data writing of the RAID_5 controller 210, the processing from distributing the write-in data stream inputted from the host 201 to writing the write-in data sub-streams into the hard disks is serial processing performed in parallel. As a result, compared with the prior art, the RAID_5 controller 210 of the present invention offers a more efficient method in data writing.

Figure 3:
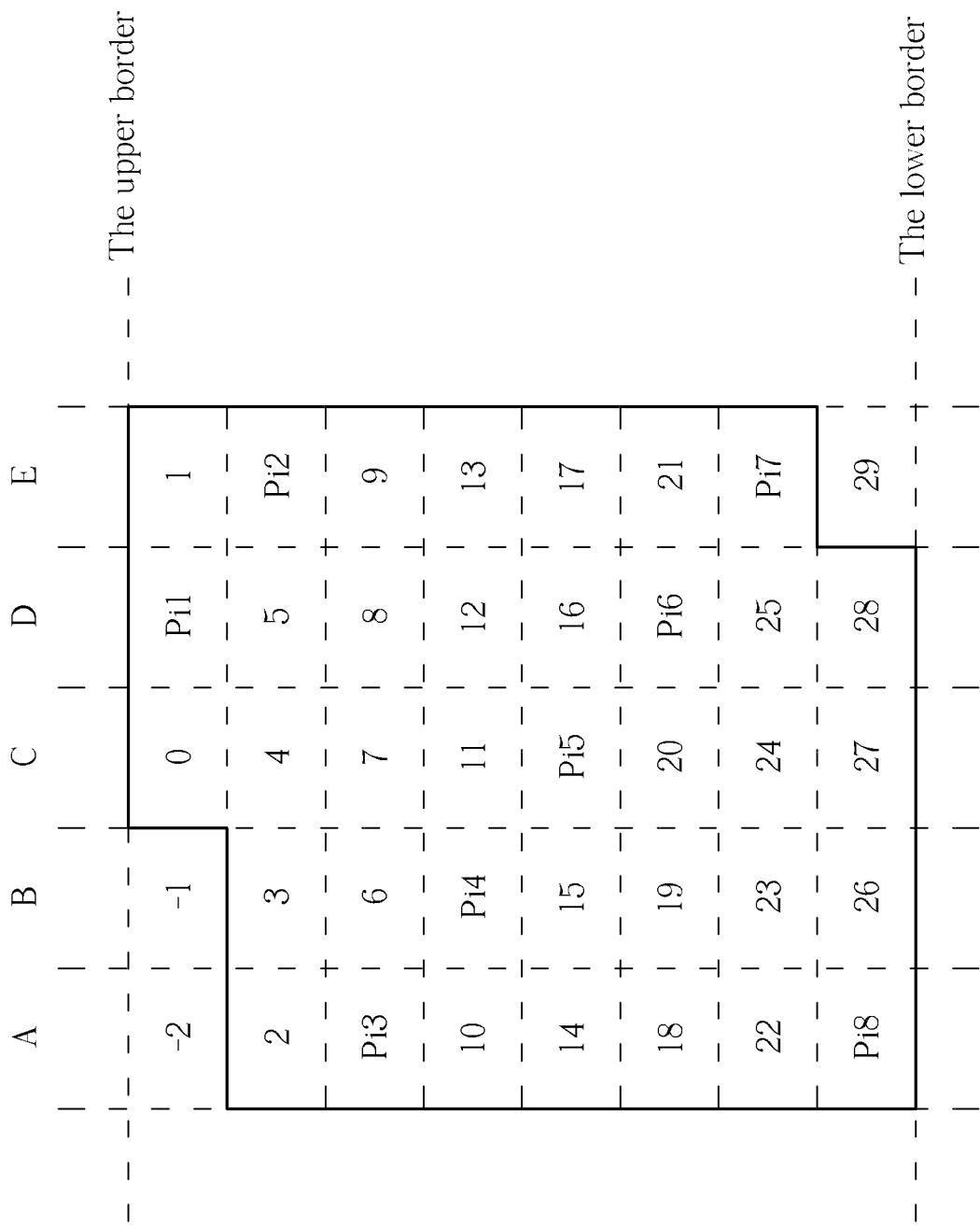
FIG. 3 is an array diagram of storage blocks corresponding to the read operation in 5 hard disks including no invalid ones.

Besides, the detailed operation principle of data accessing of the RAID_5 controller 210 in different storage regions and different stages of hard disks described below is given as an example for illustration referred to from FIG. 3 to FIG. 10 in all. Please refer to FIG. 3, FIG. 3 is an array diagram of storage blocks corresponding to the operations of data reading in 5 hard disks without invalid ones. The 5 hard disks A, B, C, D, and E in FIG. 3 are taken as examples of valid hard disks applying the method of data reading without invalid hard disks. In FIG. 3, the region surrounded by a bold line is the storage region intended to be read out, the storage blocks marked as Pi1-Pi8 are the parity storage blocks (storing the parity data), the digit in each storage block represents the read-out order corresponding to the data intended to be read-out. That is, the data are read out in order of data block, from the data block 0, the data block 1, . . . , to the data block 28. As to storage blocks not within the storage region, whether negative or greater than 28, a digit is assigned to a storage block based on its location related to the storage region intended to be read out.

Consequently, the operation of data reading starts from the data block 0 of the hard disk C, and ends at the data block 28 of the hard disk D. Due to having no invalid hard disks, the read operation does not need the data stored in the parity storage blocks, therefore the read operation on the parity storage blocks Pi1 and Pi8 disposed on the upper and lower borders respectively can be omitted directly. However, the data stored in the parity storage blocks Pi2-Pi7 disposed not on the upper and lower borders will still be read out due to the orderly reading process performed by a single hard disk and the cause of efficiency, but will be discarded by the data distribution and combination unit 230 later.

According to the aforementioned method, when the command decoder 225 receives the read command from the host 201 transmitted through the controller 220, and decodes the corresponding control command of the reading procedure according to the stages of the flag registers, the access controller of the hard disk 261 controls the hard disk A to read out the data stored in the storage blocks 2, Pi3, 10, 14, 18, and 22 orderly to generate a read-out data sub-stream, and transmits the generated read-out data sub-stream to the data register 251 in sequence. The access controller of the hard disk 262 controls the hard disk B to read out the data stored in the storage blocks 3, 6, Pi4, 15, 19, 23, and 26 orderly to generate a read-out data sub-stream, and transmits the generated read-out data sub-stream to the data register 252 in sequence. The access controller of the hard disk 263 controls the hard disk C to read out the data stored in the storage blocks 0, 4, 7, 11, Pi5, 20, 24, and 27 orderly to generate a read-out data sub-stream, and transmits the generated read-out data sub-stream to the data register 253 in sequence. The access controller of the hard disk 264 controls the hard disk D to read out the data stored in the storage blocks 5, 8, 12, 16, Pi6, 25, and 28 orderly to generate a read-out data sub-stream, and transmits the generated read-out data sub-stream to the data register 254 in sequence. The access controller of the hard disk 265 controls the hard disk E to read out data stored in the storage blocks 1, Pi2, 9, 13, 17, 21, and Pi7 orderly to generate a read-out data sub-stream, and transmits the generated read-out data sub-stream to the data register 255 in sequence. In other words, the reading efficiency is raised because the hard disk A discards the operation of data reading on the storage block Pi8 disposed on the lower border of the storage region, and the hard disk D discards the operation of data reading on the storage block Pi1 disposed on the upper border of the storage region according to the stages of the flag registers.

Next, the transmission controllers 241-245 transmit the data of the plurality of read-out data sub-streams stored in the data registers 251-255 orderly to the XOR operation unit 235, due to having no invalid hard disks, the XOR operation does not have to be performed for data recovery. Hence, the XOR operation unit 235 directly transmits the plurality of read-out data sub-streams inputted in parallel to the data distribution and combination unit 230 in parallel. The data distribution and combination unit 230 discards the parity data in the plurality of read-out data sub-streams inputted in parallel, combines the wanted read-out data in order to generate a read-out data stream based on the storage block as a processing unit, and transmits the generated read-out data stream to the host 201 through the controller 220.

Figure 4:
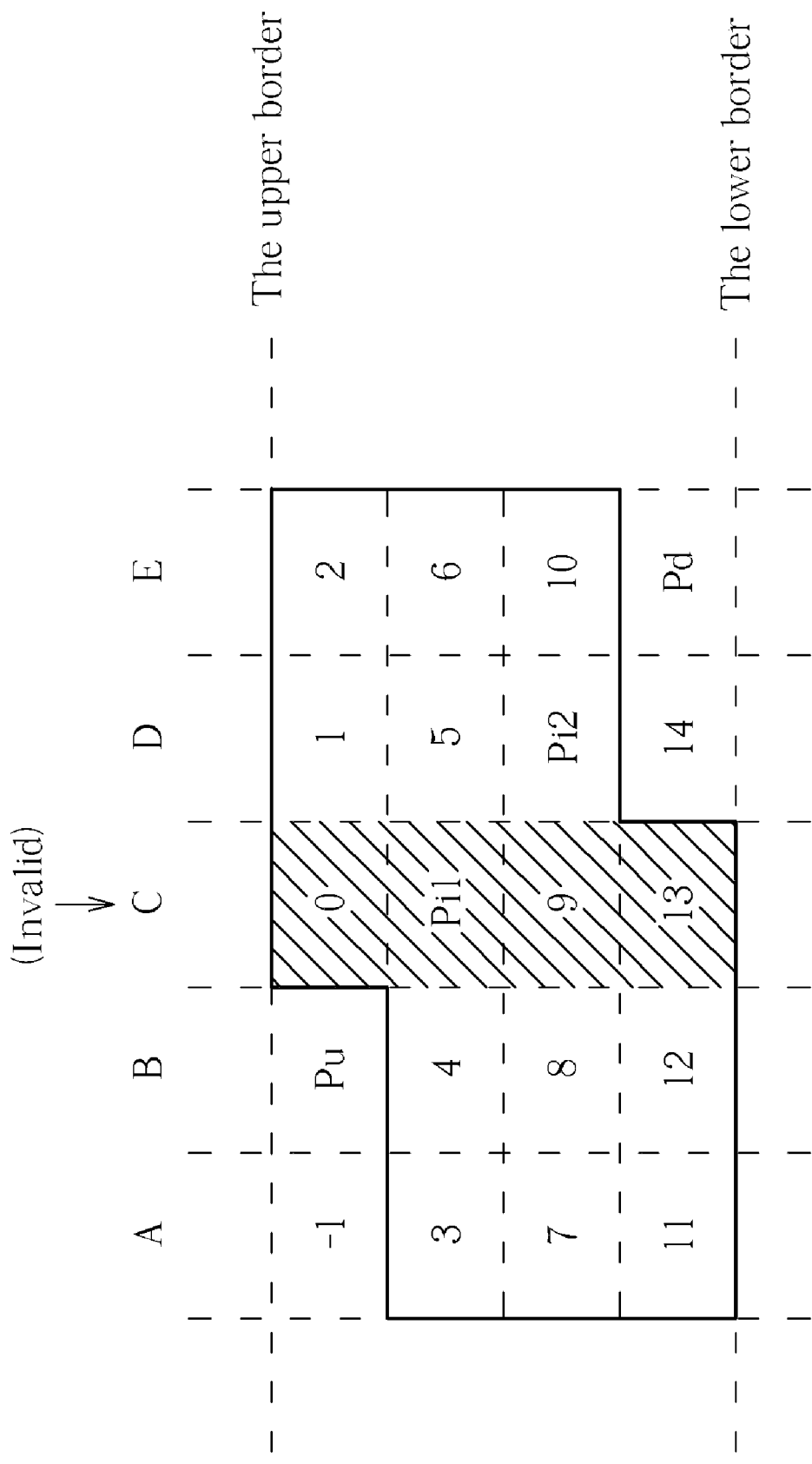
FIG. 4 is an array diagram of storage blocks corresponding to the read operation in 5 hard disks including an invalid one according to the first embodiment of the present invention.

Please refer to FIG. 4. FIG. 4 is an array diagram of storage blocks corresponding to the operations of data reading in 5 hard disks including an invalid one according to the first embodiment of the present invention. The 5 hard disks A, B, D, and E in FIG. 4 are taken as examples of valid hard disks, and the hard disk C in FIG. 4 is taken as an example of an invalid hard disk, applying the method of data reading with an invalid hard disk. In FIG. 4, the region surrounded by a bold line is the storage region intended to be read out, the data are read out in order of data block from the data block 0, the data block 1, . . . , to the data block 13. In other words, the reading process is intended to be started from the data block 0 of the hard disk C, and ended at the data block 13 of the hard disk C. However, the hard disk C is an invalid hard disk, therefore the data in the hard disk C intended to be read out should be recovered through the XOR operation performed on the data of the other 4 hard disks.

When the data stored in the storage block 0 are preferred, the data in the storage blocks −1, Pu, 1, and 2 are read out to generate the data stored in the storage block 0 originally through the XOR operation. In other words, although the storage blocks −1 and Pu are not in the storage region, the data stored in them are still needed to be read out. With the same reason, when the data stored in the storage block 13 are preferred, the data in the storage blocks 11, 12, 14, and Pd are needed to be read out to generate the data stored in the storage block 13 originally through the XOR operation. In other words, although the storage blocks 14 and Pd are not in the storage region intended to be read out, the data stored in them are still needed to be read out.

From the aforementioned method, when the command decoder 225 receives the read command from the host 201 transmitted through the controller 220, and decodes the corresponding control command of the reading procedure according to the stages of the flag register, the access controller of the hard disk 261 controls the hard disk A to read out the data stored in the storage blocks −1, 3, 7, and 11 orderly to generate a read-out data sub-stream, and transmits the generated read-out data sub-stream to the data register 251 in sequence. The access controller of the hard disk 262 controls the hard disk B to read out the data stored in the storage blocks Pu, 4, 8, and 12 orderly to generate a read-out data sub-stream, and transmits the generated read-out data sub-stream to the data register 252 in sequence. The hard disk C is an invalid hard disk, therefore the access controller of the hard disk 263 does not execute the operation of data reading. The access controller of the hard disk 264 controls the hard disk D to read out the data stored in the storage blocks 1, 5, Pi2, and 14 orderly to generate a read-out data sub-stream, and transmits the generated read-out data sub-stream to the data register 254 in sequence. The access controller of the hard disk 265 controls the hard disk E to read out the data stored in the storage blocks 2, 6, 10, and Pd orderly to generate a read-out data sub-stream, and transmits the generated read-out data sub-stream to the data register 255 in sequence. In other words, the hard disk A should read the additional data stored in the storage blocks −1 disposed on the upper border of the storage region, the hard disk B should read the additional data stored in the storage block Pu disposed on the upper border of the storage region, the hard disk D should read the additional data stored in the storage block 14 disposed on the lower border of the storage region, and the hard disk E should read the additional data stored in the storage block Pd disposed on the lower border of the storage region according to the invalidation information of the hard disk C represented in the stages of the flag registers and the control command of the reading procedure.

Next, the transmission controllers 241, 242, 244, and 245 transmit the data of the plurality of read-out data sub-streams stored in the data registers 251, 252, 254, and 255 respectively orderly to the XOR operation unit 235. The XOR operation unit 235 performs the XOR operation to recover the data stored in the storage blocks 0, 9, and 13 of the hard disk C according to the invalidation information of the hard disk C represented in the stages of the flag registers and the control command of the reading procedure. That is, a data read-out sub-stream is recovered. As to the data stored in the storage block Pi1 known as a parity storage block from the stages of the flag registers, the XOR operation does not have to be performed for recovering the parity data of Pi1. Subsequently, the XOR operation unit 235 transmits the 4 read-out data sub-streams inputted in parallel and the recovered read-out data sub-stream to the data distribution and combination unit 230 in parallel. The data distribution and combination unit 230 discards the parity data in these 5 read-out data sub-streams inputted in parallel, combines the wanted read-out data in order to generate a read-out data stream based on the storage block as a processing unit, and transmits the read-out data stream to the host 201 through the controller 220.

Figure 5:
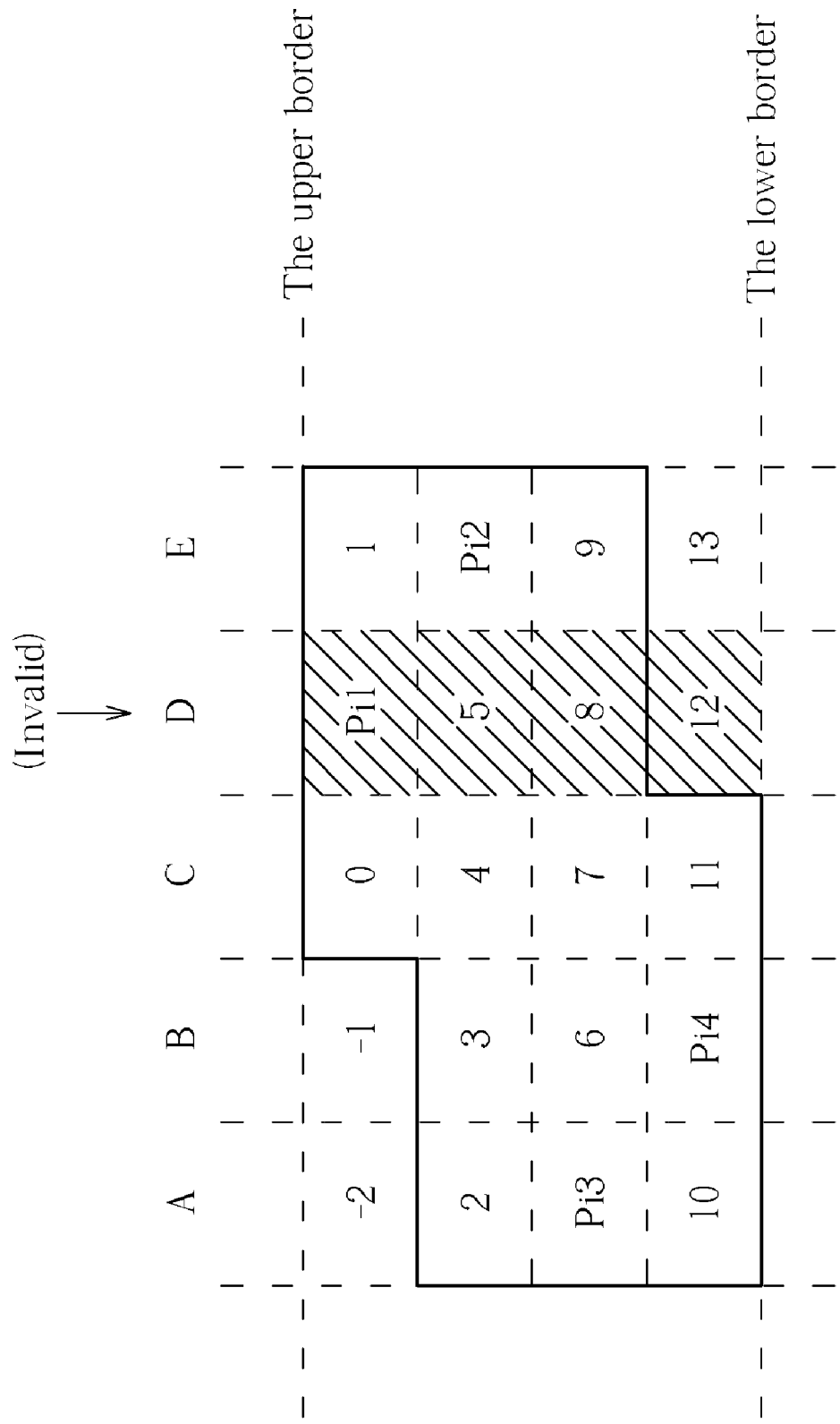
FIG. 5 is an array diagram of storage blocks corresponding to the read operation in 5 hard disks including an invalid one according to the second embodiment of the present invention.

Please refer to FIG. 5. FIG. 5 is an array diagram of storage blocks corresponding to the operations of data reading in 5 hard disks including an invalid one according to the second embodiment of the present invention. The 5 hard disks A, B, C, and E in FIG. 5 are taken as examples of valid hard disks, and the hard disk D in FIG. 5 is taken as an example of an invalid hard disk, applying the method of data reading with an invalid hard disk. In FIG. 5, the region surrounded by a bold line is the storage region intended to be read out, the data are read out in order of data block from the data block 0, the data block 1, . . . , to the data block 11. In other words, the reading process is intended to be started from the data block 0 of the hard disk C, and ended at the data block 11 of the hard disk C. However, the hard disk D is an invalid hard disk, therefore the data in the hard disk D intended to be read out should be recovered through the XOR operation performed on the data of the other 4 hard disks.

Since the storage block Pi1 disposed on the upper border of the storage region of the hard disk D is a parity storage block, the XOR operation for data recovery on Pi1 can be omitted, therefore the data stored in storage blocks −1 and −2 does not have to be read out for the invalid hard disk D. As to the data stored in the storage block 12 disposed on the lower border of the hard disk D, the XOR operation does not need to be performed for data recovery on it either, because of not being within the storage region. That is, the data stored in the storage block 13 does not have to be read out for the invalid hard disk D. In addition, the parity storage block Pi4 disposed on the lower border of the hard disk B does not have to be used for data recovery for the invalid the storage block 12, as a result, the data stored in the storage block Pi4 does not have to be read out as well.

From the aforementioned method, when the command decoder 225 receives the read command from the host 201 transmitted through the controller 220, and decodes the corresponding control command of the reading procedure according to the stages of the flag register, the access controller of the hard disk 261 controls the hard disk A to read out the data stored in the storage blocks 2, Pi3, and 10 orderly to generate a read-out data sub-stream, and transmits the generated read-out data sub-stream to the data register 251 in sequence. The access controller of the hard disk 262 controls the hard disk B to read out the data stored in the storage blocks 3 and 6 orderly to generate a read-out data sub-stream, and transmits the generated read-out data sub-stream to the data register 252 in sequence. The access controller of the hard disk 263 controls the hard disk C to read out the data stored in the storage blocks 0, 4, 7, and 11 orderly to generate a read-out data sub-stream, and transmits the generated read-out data sub-stream to the data register 253 in sequence. The hard disk D is an invalid hard disk, therefore the access controller of the hard disk 264 does not execute the operation of data reading. The access controller of the hard disk 265 controls the hard disk E to read out the data stored in the storage blocks 1, Pi2, and 9 orderly to generate a read-out data sub-stream, and transmits the generated read-out data sub-stream to the data register 255 in sequence.

Next, the transmission controllers 241, 242, 243, and 245 transmit the data of the plurality of read-out data sub-streams stored in the data registers 251, 252, 253, and 255 orderly to the XOR operation unit 235. The XOR operation unit 235 performs the XOR operation to recover the data stored in the storage blocks 5 and 8 of the hard disk D according to the invalidation information of the hard disk D represented in the stages of the flag registers. That is, a data read-out sub-stream is recovered. As to the data stored in the storage block Pi1, known as a parity storage block from the stages of the flag registers, the XOR operation does not have to be performed for recovering the parity data of Pi1. Subsequently, the XOR operation unit 235 transmits the 4 read-out data sub-streams inputted in parallel and the recovered read-out data sub-stream to the data distribution and combination unit 230 in parallel. The data distribution and combination unit 230 discards the parity data in these 5 read-out data sub-streams inputted in parallel, combines the wanted read-out data in order to generate a read-out data stream based on the storage block as a processing unit, and transmits the read-out data stream to the host 201 through the controller 220.

Figure 6:
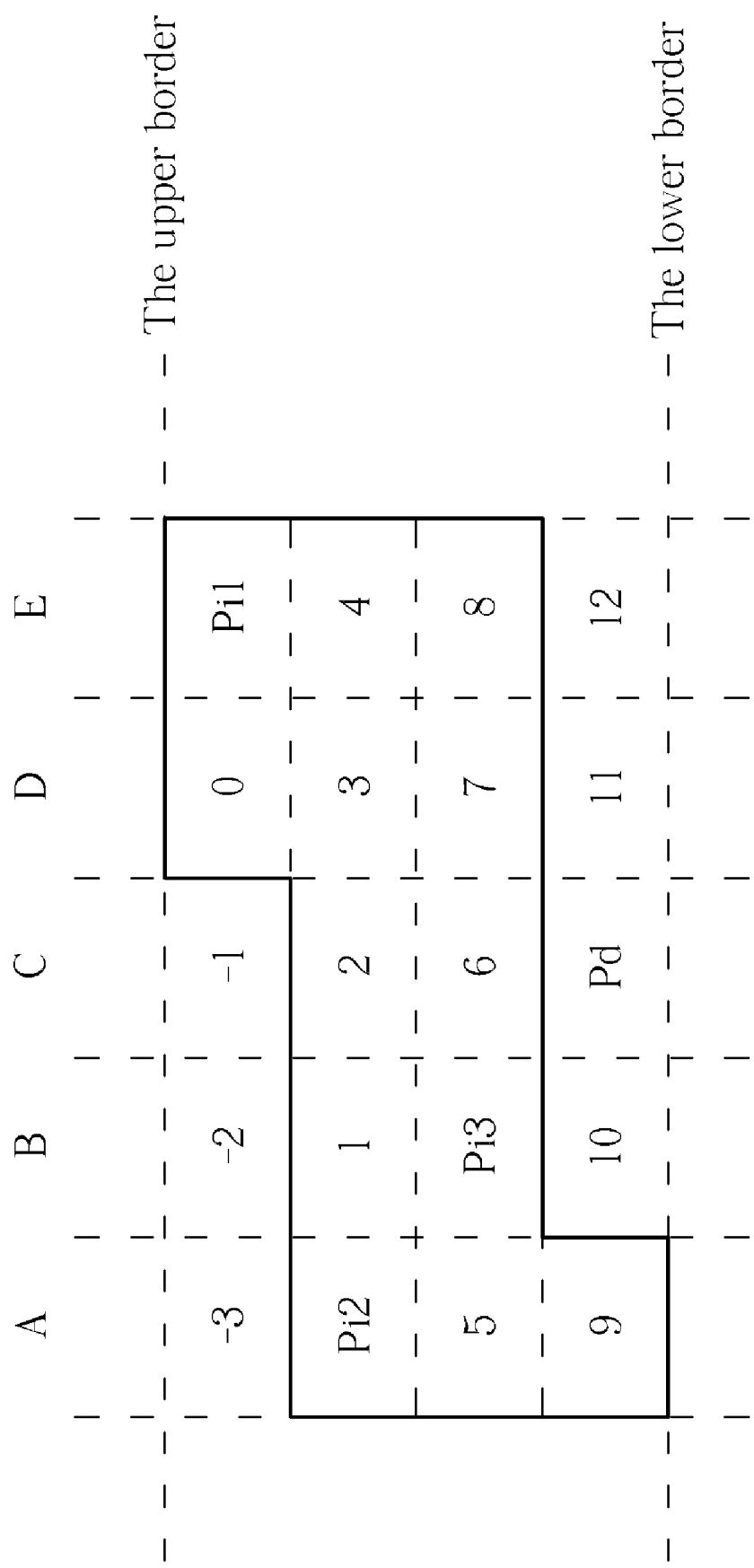
FIG. 6 is an array diagram of storage blocks corresponding to the write operation in 5 hard disks including no invalid ones according to the first embodiment of the present invention.

Please refer to FIG. 6, FIG. 6 is an array diagram of storage blocks corresponding to the operations of data writing in 5 hard disks without invalid ones according to the first embodiment of the present invention. The 5 hard disks A, B, C, D, and E in FIG. 6 are taken as examples of valid hard disks applying the method of data writing without invalid hard disks. In FIG. 6, the region surrounded by a bold line is the storage region intended to be written in, the digit in each storage block represents the write-in order corresponding to the data intended to be written in. That is, the data are written in in order of data block from the data block 0, the data block Pi1, . . . , to the data block 9. As to storage blocks not within the storage range, whether negative or greater than 9, a digit is assigned to a storage block based on its location related to the storage region intended to be written in.

Consequently, the operation of data writing starts from the data block 0 of the hard disk D, and ends at the data block 9 of the hard disk A. Due to having no invalid hard disks, all the storage blocks in the storage region intended to be written in should be written in with data. Besides, the data stored in the non-parity storage blocks disposed on the upper and lower borders not within the storage region intended to be written in will still be read out for executing the XOR operation to generate the parity data stored in the parity storage blocks disposed on the upper and lower borders. Besides, all the parity data stored in the parity storage blocks disposed on the upper and lower borders should be updated or written in, no matter if they are within the storage region intended to be written in or not.

The data intended to be written in the storage block 0 can be written in directly, the parity data in the parity storage block Pi1 disposed on the upper border should be generated through the XOR operation according to the data stored in the storage blocks 0, −1, −2, and −3. That is, read out the data in the storage blocks −1, −2, and −3 not within the storage region first, then in coordination of the data intended to be written in the storage block 0, the XOR operation unit 235 can calculate the parity data stored in the parity storage block Pi1. As to the parity data in the parity storage block Pd disposed on the lower border, although the parity storage block Pd is not within the storage region intended to be written in, the parity data should be updated according to the data written in the storage block 9, therefore the data in the storage blocks 10, 11, and 12 should be read out first, in coordination with the data intended to be written in the storage block 9, the XOR operation unit 235 can execute the XOR operation to update the parity data of the storage block Pd.

According to the aforementioned method, when the command decoder 225 receives the write command from the host 201 transmitted through the controller 220, and decodes the corresponding control command of the writing procedure according to the stages of the flag registers, the data distribution and combination unit 230 distributes the write-in data stream transmitted from the host 201 through the controller 220 according to the control command of the writing procedure, that is, the data distribution and combination unit 230 distributes the write-in data stream into 5 write-in data sub-streams transmitted in parallel based on the storage block as a processing unit, and transmits them to the XOR operation unit 235. The XOR operation unit 235 executes the XOR operation to generate the parity data intended to be written in or updated according to the 5 write-in data sub-streams transmitted in parallel in coordination with the read-out data transmitted from the hard disks. The access controllers of hard disks 261-265 and the transmission controllers 241-245 control the possible operations of data reading to determine whether to generate the parity data in coordination with the read-out data transmitted from the hard disks or not, according to the control command of the writing procedure and the stages of the flag registers. In the listed-below operations of data writing of each hard disk, possible operations of data reading are introduced.

The operations of data writing on the hard disk A include the access controller of the hard disk 261 controlling the hard disk A to read out the data stored in the storage block −3, to write the parity data into the storage block Pi2, and to write the data into the storage blocks 5 and 9. Wherein the parity data intended to be written in the storage block Pi2 are generated by the XOR operation unit 235 through the XOR operation according to the data intended to be written into the storage blocks 1, 2, 3, and 4.

The operations of data writing on the hard disk B include the access controller of the hard disk 262 controlling the hard disk B to read out the data stored in the storage block −2, to write the data into the storage block 1, to write the parity data into the storage block Pi3, and to read out the data stored in the storage block 10. Wherein the parity data intended to be written in the storage block Pi3 are generated by the XOR operation unit 235 through the XOR operation according to the data intended to be written into the storage blocks 5, 6, 7, and 8. The operations of data writing on the hard disk C include the access controller of the hard disk 263 controlling the hard disk C to read out the data stored in the storage block −1, to write the data into the storage blocks 2 and 6, and to update the parity data in the storage block Pd. Wherein the parity data intended to be updated in the storage block Pd are generated by the XOR operation unit 235 through the XOR operation according to the data intended to be written into the storage block 9 and the data read out from the storage blocks 10, 11, and 12.

The operations of data writing on the hard disk D include the access controller of the hard disk 264 controlling the hard disk D to write the data into the storage blocks 0, 3, and 7, and to read out the data stored in the storage block 11. The operations of data writing on the hard disk E include the access controller of the hard disk 265 controlling the hard disk E to write the parity data into the storage block Pi1, to write the data into the storage blocks 4 and 8, and to read out the data stored in the storage block 12. Wherein the parity data intended to be written into the storage block Pi1 are generated by the XOR operation unit 235 through the XOR operation according to the data intended to be written into the storage block 0 and the data read out from the storage blocks −3, −2, and −1.

Figure 7:
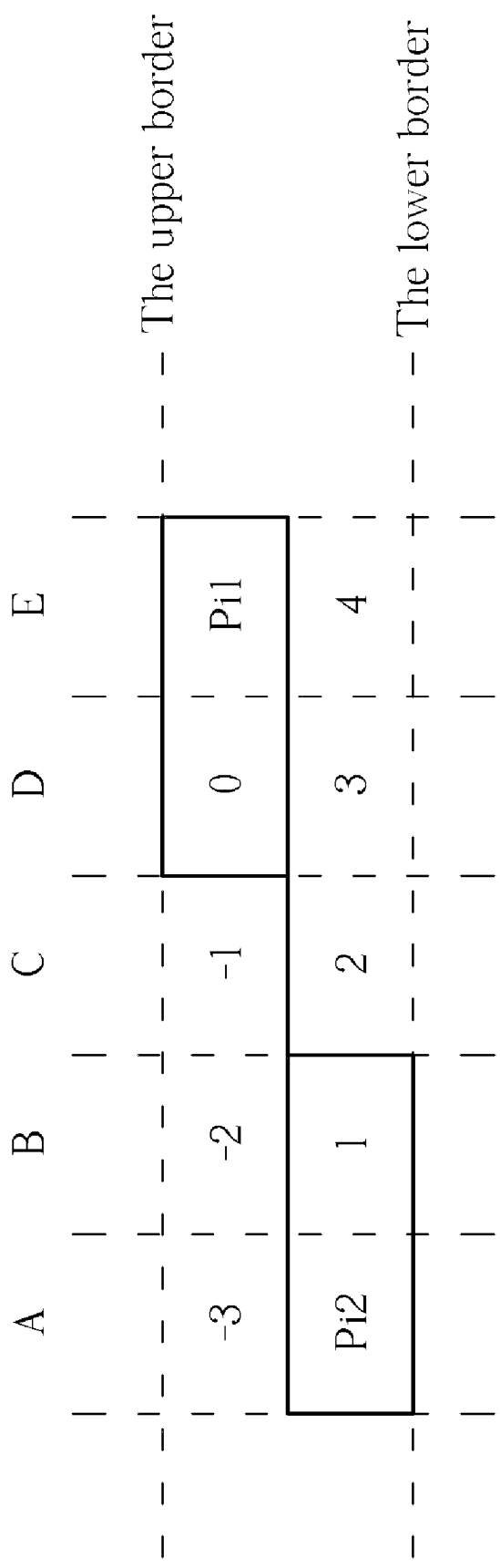
FIG. 7 is an array diagram of storage blocks corresponding to the write operation in 5 hard disks including no invalid ones according to the second embodiment of the present invention.

Please refer to FIG. 7, FIG. 7 is an array diagram of storage blocks corresponding to the operations of data writing in 5 hard disks without invalid ones according to the second embodiment of the present invention. The 5 hard disks A, B, C, D, and E in FIG. 7 are taken as examples of valid hard disks applying the method of data writing without invalid hard disks, and the region surrounded by a bold line is still the storage region intended to be written in.

The parity data in the parity storage block Pi1 disposed on the upper border should be generated by the XOR operation unit 235 through the XOR operation according to the data intended to be written in the storage block 0 in coordination with the data read out from the storage blocks −1, −2, and −3. The parity data in the parity storage block Pi2 disposed on the lower border should be generated by the XOR operation unit 235 through the XOR operation according to the data intended to be written in the storage block 1 in coordination with the data read out from the storage blocks 2, 3, and 4.

According to the aforementioned method, the preprocessing of the write-in data stream and the write command is similar to that of the first embodiment shown in FIG. 6, therefore the description of it is omitted here for the sake of brevity. The operations of data writing on each hard disk are introduced directly. The operations of data writing on the hard disk A include the access controller of the hard disk 261 controlling the hard disk A to read out the data stored in the storage block −3, and to write the parity data into the storage block Pi2. Wherein the parity data intended to be written in the storage block Pi2 are generated by the XOR operation unit 235 through the XOR operation according to the data intended to be written into the storage block 1, and the data read out from the storage blocks 2, 3, and 4. The operations of data writing on the hard disk B include the access controller of the hard disk 262 controlling the hard disk B to read out the data stored in the storage block −2, and to write the data into the storage block 1.

The operations of data writing on the hard disk C include the access controller of the hard disk 263 controlling the hard disk C to read out the data stored in the storage block −1 and 2. The operations of data writing on the hard disk D include the access controller of the hard disk 264 controlling the hard disk D to write the data into the storage block 0, and to read out the data stored in the storage block 3. The operations of data writing to the hard disk E include the access controller of the hard disk 265 controlling the hard disk E to write the parity data into the storage block Pi1, and to read out the data stored in the storage block 4. Wherein the parity data intended to be written into the storage block Pi1 are generated by the XOR operation unit 235 through the XOR operation according to the data intended to be written into the storage block 0 and the data read out from the storage blocks −3, −2, and −1.

In another method of data writing without invalid hard disks, when the storage blocks on the corresponding upper and lower borders of the storage region intended to be written in are all included in the storage region, the XOR operation can be executed to generate the parity data directly according to the 5 write-in data sub-streams without performing any additional read operations. And then the generated parity data are inserted into the corresponding write-in data sub-stream based on the storage block as a processing unit. After that, the 5 write-in data sub-streams are written into the 5 hard disks A, B, C, D, and E in parallel.

Figure 8:
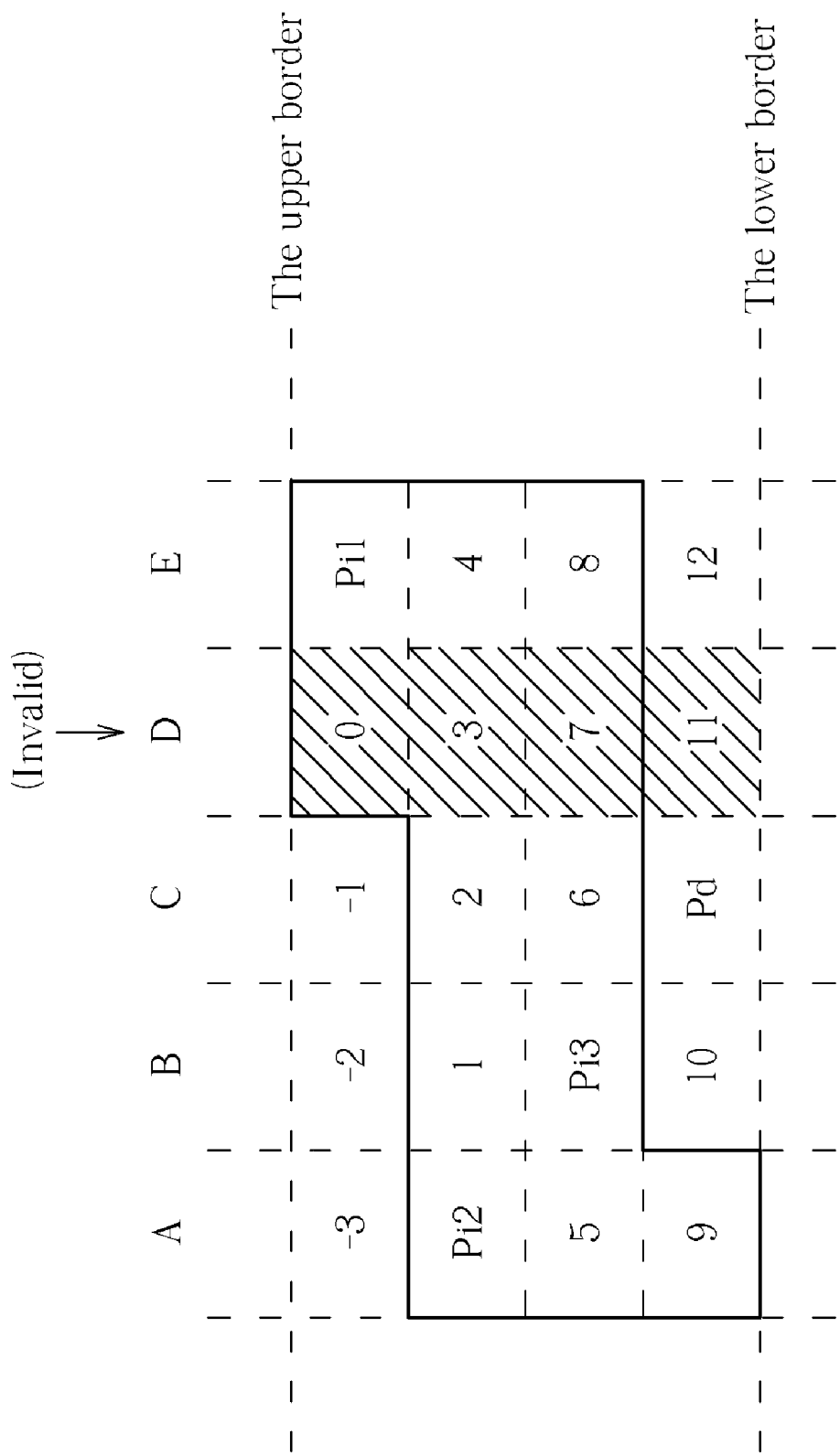
FIG. 8 is an array diagram of storage blocks corresponding to the write operation in 5 hard disks including an invalid one according to the first embodiment of the present invention.

Please refer to FIG. 8. FIG. 8 is an array diagram of storage blocks corresponding to the operations of data writing in 5 hard disks including an invalid one according to the first embodiment of the present invention. The 5 hard disks A, B, C, and E in FIG. 8 are taken as examples of valid hard disks, and the hard disk D in FIG. 8 is taken as an example of an invalid hard disk, applying the method of data reading with an invalid hard disk. In FIG. 8, the region surrounded by a bold line is the storage region intended to be written in.

Due to the hard disk D as an invalid hard disk, the write or read operations will not be executed to the hard disk D during the operations of data writing. That is, the operations of data writing on the hard disk D are all omitted, and the data intended to be read out from the hard disk D should be generated by the XOR operation unit 235 through the XOR operation performed on the data of the other 4 hard disks.

Therefore, the parity data in the parity storage block Pi1 disposed on the upper border should be generated by the XOR operation unit 235 through the XOR operation according to the data read out from the storage blocks −1, −2, and −3 in coordination with the data intended to be written in the storage block 0 of the hard disk D originally. The parity data in the parity storage block Pd disposed on the lower border should be updated according to the data stored in the storage block 11 of the hard disk D. However, the data stored in the storage block 11 of the hard disk D are already invalid, the old parity data stored in the parity storage block Pd, the old data stored in the storage block 9, and the data stored in the storage blocks 10 and 12 should be read out first, and then the data stored in the storage block 11 of the hard disk D are recovered through the XOR operation performed by the XOR operation unit 235. After that, the parity data in the parity storage block Pd can be generated by the XOR operation unit 235 through the XOR operation according to the recovered data of the storage block 11, the data intended to be written in the storage block 9, and the data read out from the storage blocks 10 and 12.

According to the aforementioned method, the preprocessing of the write-in data stream and the write command is similar to that of the first embodiment shown in FIG. 6, therefore the description of it is omitted here for the sake of brevity. The operations of data writing on each hard disk are introduced directly. The operations of data writing on the hard disk A include the access controller of the hard disk 261 controlling the hard disk A to read out the data stored in the storage block −3, to write the parity data into the storage block Pi2, to write the data into the storage block 5, to read out the old data stored in the storage block 9, and to write the data into the storage block 9. Wherein the parity data intended to be written in the storage block Pi2 are generated by the XOR operation unit 235 through the XOR operation according to the data intended to be written into the storage blocks 1, 2, 3, and 4. The operations of data writing on the hard disk B include the access controller of the hard disk 262 controlling the hard disk B to read out the data stored in the storage block −2, to write the data into the storage block 1, to write the parity data into the storage block Pi3, and to read out the data stored in the storage block 10. Wherein the parity data intended to be written in the storage block Pi3 are generated by the XOR operation unit 235 through the XOR operation according to the data intended to be written into the storage blocks 5, 6, 7, and 8.

The operations of data writing on the hard disk C include the access controller of the hard disk 263 controlling the hard disk C to read out the data stored in the storage block −1, to write the data into the storage blocks 2 and 6, to read out the old parity data stored in the storage block Pd, and to update the parity data in the storage block Pd. Wherein the old parity data stored in the storage block Pd are generated: first, the data stored in the storage block 11 are recovered by the XOR operation unit 235 through the XOR operation according to the data read out from the storage blocks 10 and 12 in coordination with the old data read out from the storage block 9, and then the parity data intended to be updated in the storage block Pd are generated by the XOR operation unit 235 through the XOR operation according to the recovered data in the storage block 11, the data intended to be written into the storage block 9, and the data read out from the storage blocks 10 and 12. The operations of data writing on the hard disk E include the access controller of the hard disk 265 controlling the hard disk E to write the parity data into the storage block Pi1, to write the data into the storage blocks 4 and 8, and to read out the data stored in the storage block 12. Wherein the parity data intended to be written into the storage block Pi1 are generated by the XOR operation unit 235 through the XOR operation according to the data intended to be written into the storage block 0 (although the writing procedure to the storage block 0 will not be executed) and the data read out from the storage blocks −3, −2, and −1.

Figure 9:
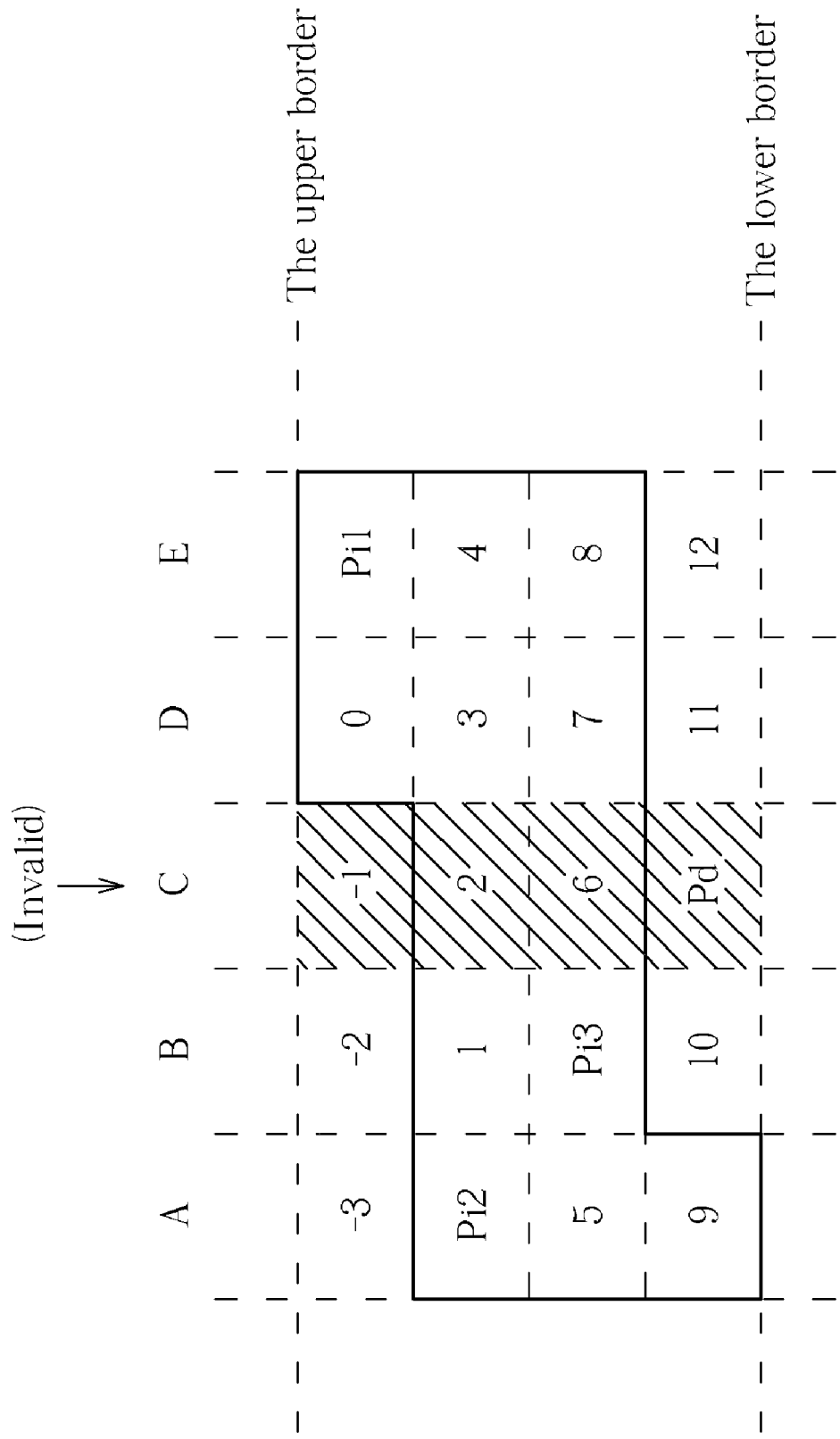
FIG. 9 is an array diagram of storage blocks corresponding to the write operation in 5 hard disks including an invalid one according to the second embodiment of the present invention.

Please refer to FIG. 9. FIG. 9 is an array diagram of storage blocks corresponding to the write operation in 5 hard disks including an invalid one according to the second embodiment of the present invention. The 5 hard disks A, B, D, and E in FIG. 9 are taken as examples of valid hard disks, and the hard disk C in FIG. 9 is taken as an example of an invalid hard disk, applying the method of data reading with an invalid hard disk. In FIG. 9, the region surrounded by a bold line is the storage region intended to be written in.

The hard disk C being an invalid hard disk, the operations of data writing or reading will not be executed to the hard disk C during the writing procedures. That is, the operations of data writing on the hard disk C are all omitted, and the data intended to be read out from the hard disk C should be generated by the XOR operation unit 235 through the XOR operation performed on the data of the other 4 hard disks.

Therefore, the parity data in the parity storage block Pi1 disposed on the upper border should be generated by the XOR operation unit 235 through the XOR operation according to the data read out from the storage blocks −1, −2, and −3 in coordination with the data intended to be written in the storage block 0 of the hard disk D. However, the data stored in the storage block −1 of the hard disk C are already invalid, the old parity data stored in the parity storage block Pi1, the old data stored in the storage block 0, and the data stored in the storage blocks −2 and −3 should be read out first, and through the XOR operation performed by the XOR operation unit 235 to recover the data stored in the storage block −1 of the hard disk C. After that, the parity data intended to be written in the parity storage block Pi1 can be calculated. The parity storage block Pd disposed on the lower border is an invalid storage block, no additional operation should be performed on it.

According to the aforementioned method, the preprocessing of the write-in data stream and the write command is similar to that of the first embodiment shown in FIG. 6, therefore the description of it is omitted here for the sake of brevity. The operations of data writing on each hard disk are introduced directly. The operations of data writing to the hard disk A include the access controller of the hard disk 261 controlling the hard disk A to read out the data stored in the storage block −3, to write the parity data into the storage block Pi2, and to write the data into the storage blocks 5 and 9. Wherein the parity data intended to be written in the storage block Pi2 are generated by the XOR operation unit 235 through the XOR operation according to the data intended to be written into the storage blocks 1, 2, 3, and 4. The operations of data writing to the hard disk B include the access controller of the hard disk 262 controlling the hard disk B to read out the data stored in the storage block −2, to write the data into the storage block 1, and to write the parity data into the storage block Pi3. Wherein the parity data intended to be written in the storage block Pi3 are generated by the XOR operation unit 235 through the XOR operation according to the data intended to be written into the storage blocks 5, 6, 7, and 8.

The operations of data writing on the hard disk D include the access controller of the hard disk 264 controlling the hard disk D to read out the old data stored in the storage block 0, and to write the data into the storage blocks 0, 3, and 7. The operations of data writing on the hard disk E include the access controller of the hard disk 265 controlling the hard disk E to read out the old parity data stored in the storage block Pi1, to write the parity data into the storage block Pi1, and to write the data into the storage blocks 4 and 8. Wherein the parity data intended to be written into the storage block Pi1 are generated by the XOR operation unit 235 through the XOR operation according to the data intended to be written into the storage block 0, the recovered data in the storage block −1, and the data read out from the storage blocks −3 and −2.

Figure 10:
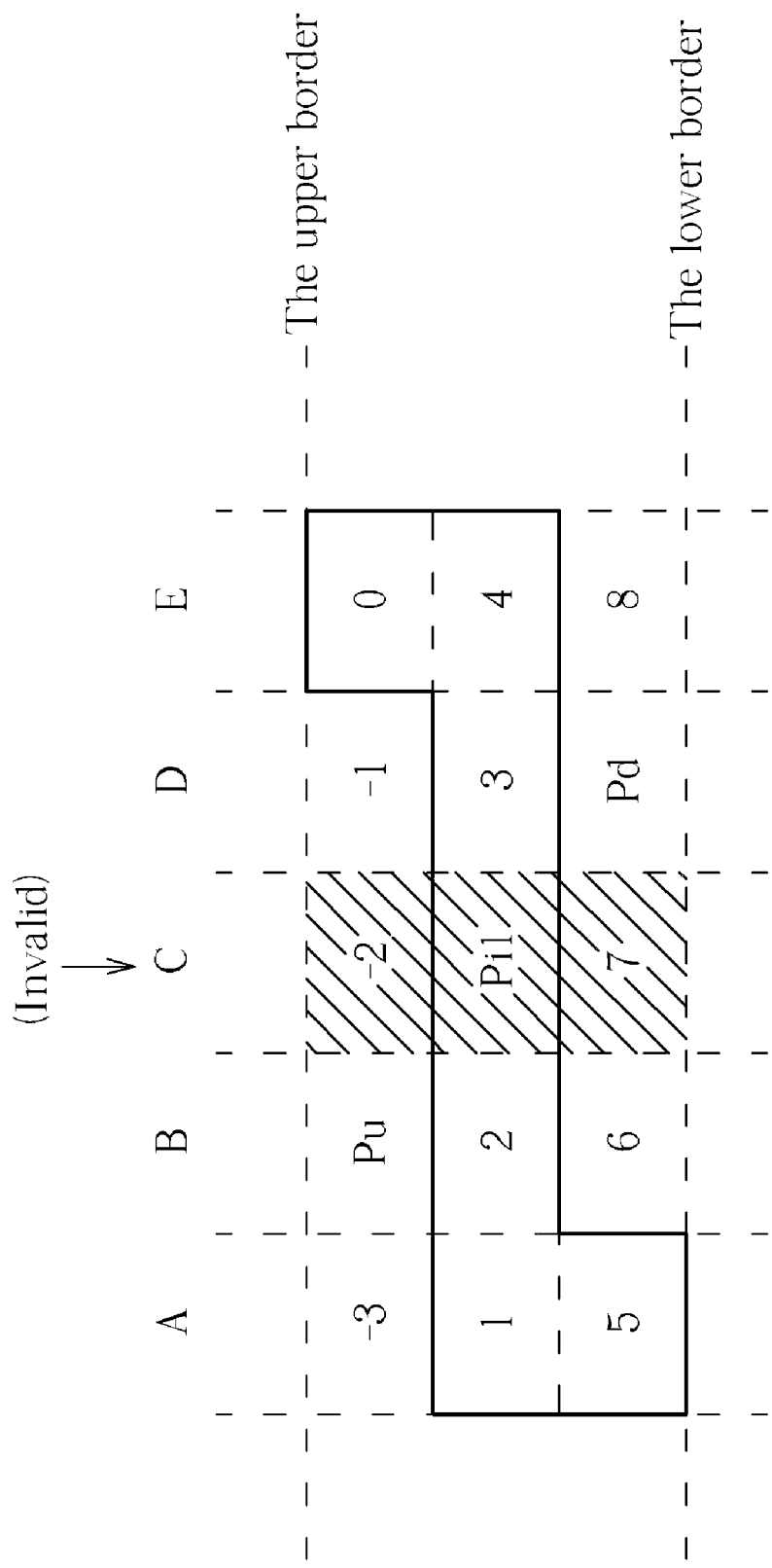
FIG. 10 is an array diagram of storage blocks corresponding to the write operation in 5 hard disks including an invalid one according to the third embodiment of the present invention.

Please refer to FIG. 10. FIG. 10 is an array diagram of storage blocks corresponding to the operations of data writing in 5 hard disks including an invalid one according to the third embodiment of the present invention. The 5 hard disks A, B, D, and E in FIG. 10 are taken as examples of valid hard disks, and the hard disk C in FIG. 10 is taken as an example of an invalid hard disk, applying the method of data reading with an invalid hard disk. In FIG. 10, the region surrounded by a bold line is the storage region intended to be written in.

The hard disk C being an invalid hard disk, the operations of data writing or reading will not be executed to the hard disk C during the writing procedures. That is, the operations of data writing on the hard disk C are all omitted, and the data intended to be read out from the hard disk C should be generated by the XOR operation unit 235 through the XOR operation performed on the data of the other 4 hard disks.

Therefore, the parity data in the parity storage block Pu disposed on the upper border should be updated by the XOR operation unit 235 through the XOR operation according to the data read out from the storage blocks −1, −2, and −3 in coordination with the data intended to be written in the storage block 0 of the hard disk E. However, the data stored in the storage block −2 of the hard disk C are already invalid, the old parity data stored in the parity storage block Pu, the old data stored in the storage block 0, and the data stored in the storage blocks −1 and −3 should be read out first, and through the XOR operation performed by the XOR operation unit 235 to recover the data stored in the storage block −2 of the hard disk C. After that, the parity data intended to be written in the parity storage block Pu can be updated. The parity storage block Pd disposed on the lower border should be updated by the XOR operation unit 235 through the XOR operation according to the data read out from the storage blocks 6, 7, and 8 in coordination with the data intended to be written in the storage block 5 of the hard disk A. However, as the data stored in the storage block 7 of the hard disk C are already invalid, the old parity data stored in the parity storage block Pd, the old data stored in the storage block 5, and the data stored in the storage blocks 6 and 8 should be read out first, and the XOR operation should be performed by the XOR operation unit 235 to recover the data stored in the storage block 7 of the hard disk C. After that, the parity data intended to be updated in the parity storage block Pd can be calculated.

According to the aforementioned method, the preprocessing of the write-in data stream and the write command is similar to that of the first embodiment shown in FIG. 6, therefore the description of it is omitted here for the sake of brevity. The operations of data writing on each hard disk are introduced directly. The operations of data writing on the hard disk A include the access controller of the hard disk 261 controlling the hard disk A to read out the data stored in the storage block −3, to write the data into the storage block 1, to read out the old data stored in the storage block 5, and to write the data into the storage blocks 5. The operations of data writing on the hard disk B include the access controller of the hard disk 262 controlling the hard disk B to read out the old parity data stored in the storage block Pu, to write the parity data into the storage block Pu, to write the data into the storage block 2, and to read out the data stored in the storage block 6. Wherein the parity data intended to be written in the storage block Pu are generated by the XOR operation unit 235 through the XOR operation according to the data read out from the storage blocks −3 and −1, the recovered data in the storage block −2, and the data intended to be written into the storage block 0.

The operations of data writing on the hard disk D include the access controller of the hard disk 264 controlling the hard disk D to read out the data stored in the storage block −1, to write the data into the storage blocks 3, to read out the old parity data stored in the storage block Pd, and to write the parity data into the storage block Pd. Wherein the parity data intended to be written into the storage block Pd are generated by the XOR operation unit 235 through the XOR operation according to the data intended to be written into the storage block 5, the recovered data in the storage block 7, and the data read out from the storage blocks 6 and 8. The operations of data writing on the hard disk E include the access controller of the hard disk 265 controlling the hard disk E to read out the old data stored in the storage block 0, to write the data into the storage block 0, to write the data into the storage block 4, and to read out the data stored in the storage block 8.

Figure 11:
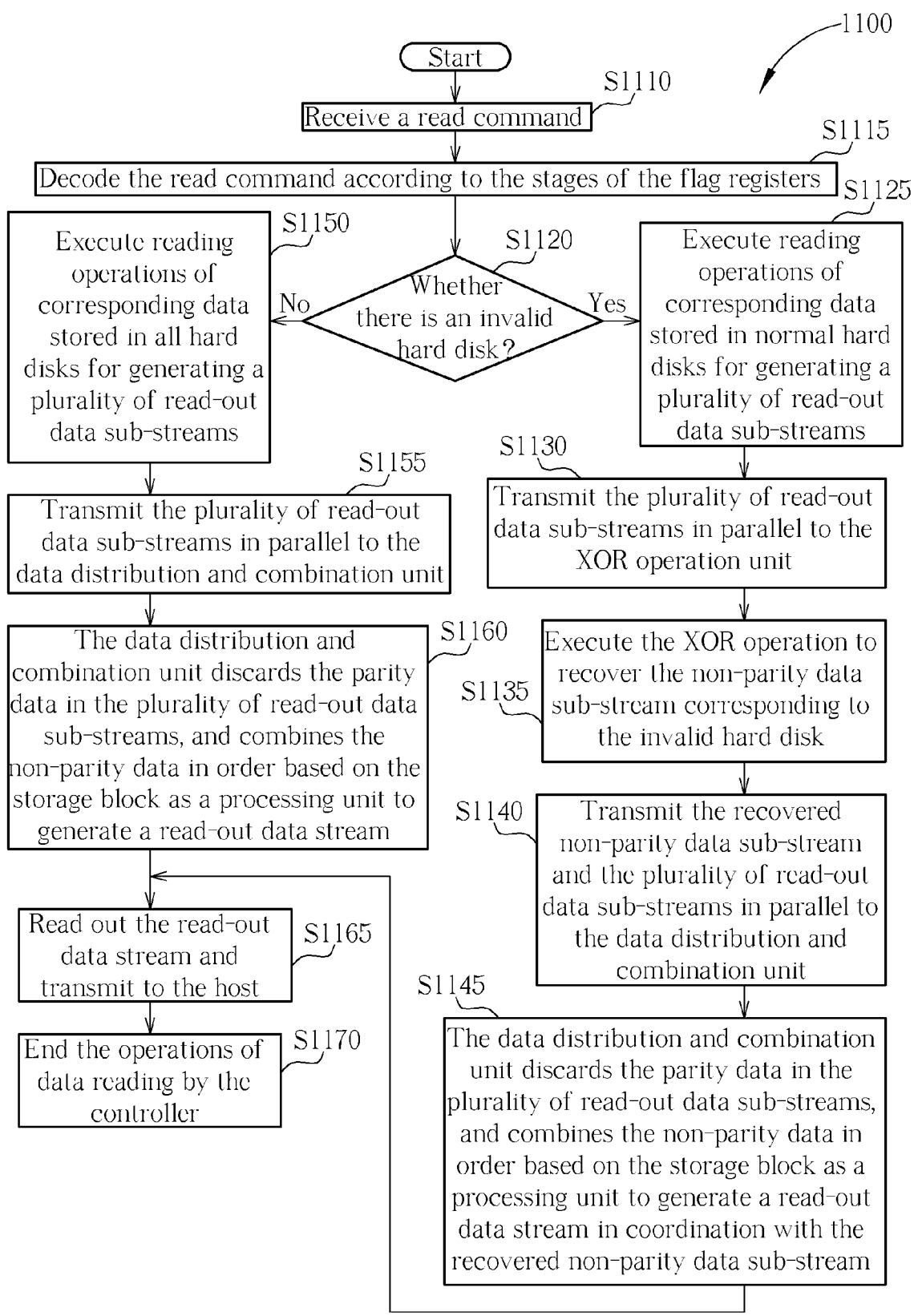
FIG. 11 is a flow chart of a reading method of the RAID_5 controller in FIG. 2 in coordination with the operations of data reading from FIG. 3 to FIG. 5 according to the present invention.

Please refer to FIG. 11. FIG. 11 is a flow chart of a reading method 1100 of the RAID_5 controller in FIG. 2 in coordination with the operations of data reading from FIG. 3 to FIG. 5 according to the present invention. The reading method 1100 of the RAID_5 controller of the present invention includes the following steps:

Step S1110: The controller 220 receives a read command from the host 201, and transmits the read command to the command decoder 225.

Step S1115: The command decoder 225 decodes the read command to generate the control command of the corresponding reading procedures according to the stages of the flag registers.

Step S1120: Determine whether there is an invalid hard disk or not according to the stages of the flag registers. If so, go to step S1125, if not, go to step S1150.

Step S1125: The access controllers of hard disks corresponding to the normal hard disks execute reading operations of corresponding data for generating a plurality of read-out data sub-streams.

Step S1130: Transmit the plurality of read-out data sub-streams in parallel to the XOR operation unit 235.

Step S1135: The XOR operation unit 235 executes the XOR operation to recover the non-parity data sub-stream corresponding to the invalid hard disks according to the plurality of read-out data sub-streams.

Step S1140: Transmit the recovered non-parity data sub-stream and the plurality of read-out data sub-streams in parallel to the data distribution and combination unit 230.

Step S1145: The data distribution and combination unit 230 discards the parity data in the plurality of read-out data sub-streams, and combines the non-parity data in order based on the storage block as a processing unit to generate a read-out data stream in coordination with the recovered non-parity data sub-stream. Go to step S1165.

Step S1150: The access controllers of hard disks 261-265 execute reading operations of corresponding data stored in hard disks A281-E285 for generating a plurality of read-out data sub-streams.

Step S1155: Transmit the plurality of read-out data sub-streams in parallel to the data distribution and combination unit 230.

Step S1160: The data distribution and combination unit 230 discards the parity data in the plurality of read-out data sub-streams, and combines the non-parity data in order based on the storage block as a processing unit to generate a read-out data stream.

Step S1165: The controller 220 transmits the read-out data stream to the host 201.

Step S1170: End the operations of data reading.

In the above-mentioned flow chart of the reading method 1100 of the RAID_5 controller, the access controllers of hard disks corresponding to the normal hard disks in step S1125 execute the operations of data reading on the corresponding data based on a sector as the basic data reading unit. Besides, the operations of data reading on the corresponding data in step S1125 include: when the non-parity storage blocks of the invalid hard disk include the storage blocks disposed on the upper border of the storage region intended to be read out, the data stored in the storage blocks disposed on the upper border not within the storage region intended to be read out should be read out, too; when the non-parity storage blocks of the invalid hard disk include the storage blocks disposed on the lower border of the storage region intended to be read out, the data stored in the storage blocks disposed on the lower border not within the storage region intended to be read out should be read out, too. The access controllers of hard disks 261-265 executing the corresponding operations of data reading to the corresponding hard disks A281-E285 in step S1150 includes the access controllers of hard disks 261-265 executing the corresponding operations of data reading to the corresponding hard disks A281-E285 based on a sector as the basic reading unit.

Figure 12:
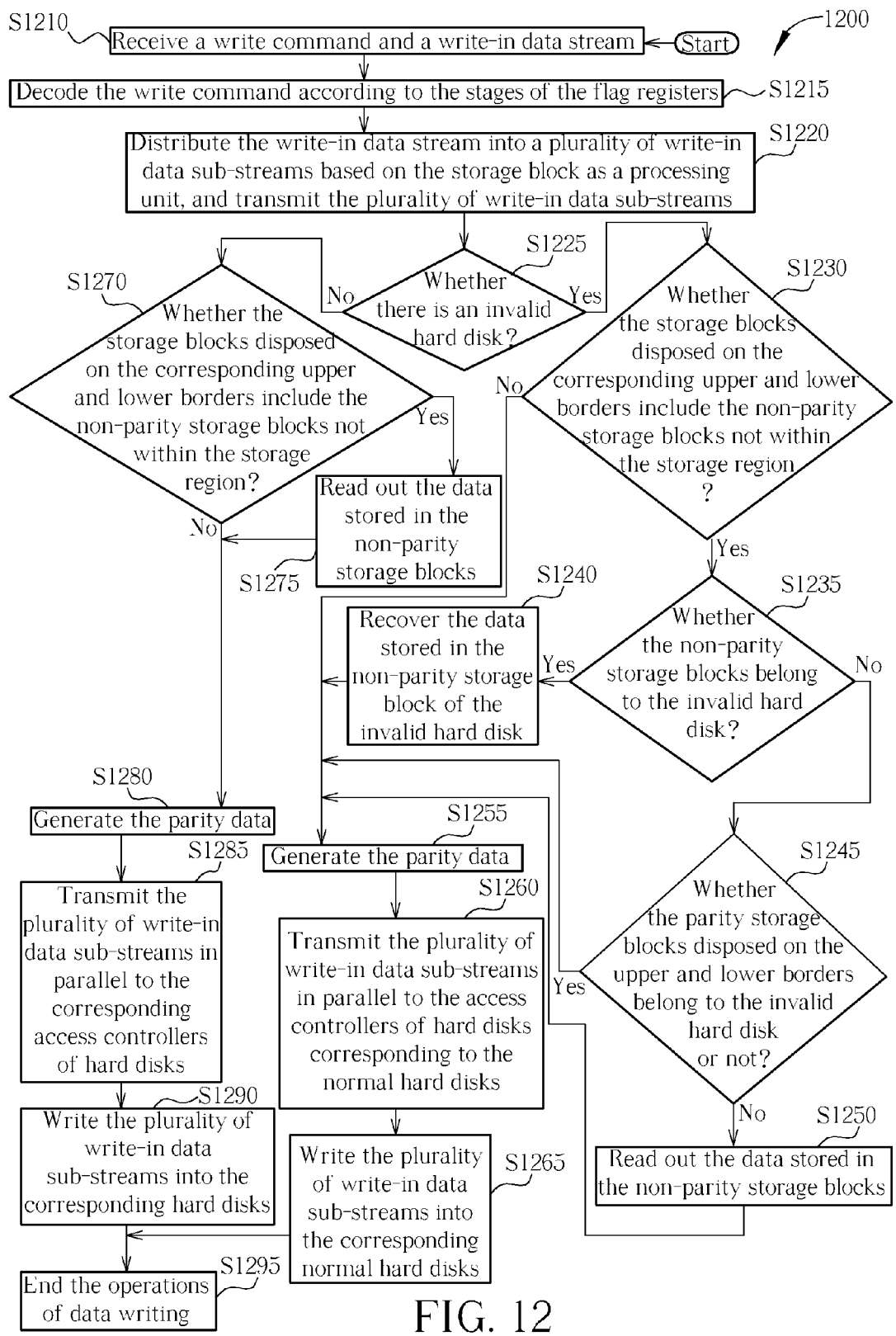
FIG. 12 is a flow chart of a writing method of the RAID_5 controller in FIG. 2 in coordination with the operations of data writing from FIG. 6 to FIG. 10 according to the present invention.

Please refer to FIG. 12. FIG. 12 is a flow chart of a writing method 1200 of the RAID_5 controller in FIG. 2 in coordination with the operations of data reading from FIG. 6 to FIG. 10 according to the present invention. The reading method 1200 of the RAID_5 controller of the present invention includes the following steps:

Step S1210: The controller 220 receives a write command and a write-in data stream from the host 201, transmits the write command to the command decoder 225, and transmits the write-in data stream to the data distribution and combination unit 230.

Step S1215: The command decoder 225 decodes the write command to generate the control command of the corresponding writing procedures according to the stages of the flag registers.

Step S1220: The data distribution and combination unit 230 distributes the write-in data stream into a plurality of write-in data sub-streams based on the storage block as a processing unit, and transmits the plurality of write-in data sub-streams to the XOR operation unit 235 in parallel.

Step S1225: Determine whether there is an invalid hard disk or not according to the stages of the flag registers. If so, go to step S1230, if not, go to step S1270.

Step S1230: Determine whether the storage blocks disposed on the corresponding upper and lower borders of the storage region intended to be written in include the non-parity storage blocks not within the storage region intended to be written in. If so, go to step S1235, if not, go to step S1255.

Step S1235: Determine whether the non-parity storage blocks disposed on the upper and lower borders not within the storage region intended to be written in belong to the invalid hard disk or not. If so, go to step S1240, if not, go to step S1245.

Step S1240: The XOR operation unit 235 executes the XOR operation to recover the data stored in the non-parity storage block of the invalid hard disk according to the data read out from the related storage blocks. Go to step S1255.

Step S1245: Determine whether the parity storage blocks disposed on the upper and lower borders belong to the invalid hard disk or not. If so, go to step S1255, if not, go to step S1250.

Step S1250: Read out the data stored in the non-parity storage blocks disposed on the border, on which the parity storage blocks does not belong to the invalid hard disk, not within the storage region intended to be written in. Go to Step S1255.

Step S1255: Execute the XOR operation to generate the parity data, and insert the parity data into the corresponding write-in data sub-streams.

Step S1260: Transmit the plurality of write-in data sub-streams in parallel to the access controllers of hard disks corresponding to the normal hard disks.

Step S1265: Write the plurality of write-in data sub-streams including the parity data into the corresponding normal hard disks. Go to step S1295.

Step S1270: Determine whether the storage blocks disposed on the corresponding upper and lower borders of the storage region intended to be written in include the non-parity storage blocks not within the storage region intended to be written in. If so, go to step S1275, if not, go to step S1280.

Step S1275: Read out the data stored in the non-parity storage blocks disposed on the upper and lower borders not within the storage region intended to be written in. Go to Step S1280.

Step S1280: Execute the XOR operation to generate the parity data, and insert the parity data into the corresponding write-in data sub-streams.

Step S1285: Transmit the plurality of write-in data sub-streams including the parity data in parallel to the corresponding access controllers of hard disks.

Step S1290: Write the plurality of write-in data sub-streams including the parity data into the corresponding hard disks.

Step S1295: End the operations of data writing.

In the above-mentioned flow chart of the writing method 1200 of the RAID_5 controller, executing the XOR operation to generate the parity data and inserting the parity data into the corresponding write-in data sub-stream in step S1255 includes: when the parity storage blocks disposed on the upper and lower borders all belong to the invalid hard disk, the process to generate the parity data of the parity storage blocks disposed on the upper and lower borders is omitted, and the data of the storage blocks disposed on the corresponding upper and lower borders in the plurality of write-in data sub-streams are transmitted to the plurality of the access controllers of hard disks corresponding to the normal hard disks in parallel. Writing the plurality of write-in data sub-streams including the parity data into the corresponding normal hard disks in step S1265 is based on a sector as the basic writing unit. Writing the plurality of write-in data sub-streams including the parity data into the corresponding hard disks in step S1290 is based on a sector as the basic writing unit.

Please note that although in the above-mentioned embodiments of the present invention, a RAID_5 controller with data stream distribution and aggregation operations based on the primitive data access block of storage devices is introduced for illustration, the present invention is not limited to be applied to the RAID_5 system, and other storage devices such as SSDs (Solid State Drives), or storage devices based on double data rate random access memories such as i-RAM can be applied as well. The access controllers of hard disks can be replaced with other access controllers of storage devices, and the interface through which the access controllers of storage devices coupled to the storage devices can be a serial ATA interface, an USB interface, an SAS interface, an IEEE-1394 interface, or an eSATA interface.

From the above-mentioned, the principle of the RAID_5 controller and the accessing method thereof according to the present invention is utilizing the primitive data access block of storage devices as a storage and processing unit of the data stored in the RAID_5 and the parity data, combined with methods of data distribution and aggregation between a data stream and a plurality of data sub-streams, to accelerate the access of the RAID_5 system. Especially in the XOR operation for processing the parity data or recovering the data, the serial processing is performed in parallel. Therefore, no matter if there are the operations of data read out from the plurality of read-out data sub-streams to the single read-out data stream, or data written in from the single read-out data stream into the plurality of read-out data sub-streams, the efficiency of data access is accelerated by data transmission and processed in parallel.

The RAID_5 system of the present invention utilizes the primitive data access block of storage devices as a processing block, compared with the conventional RAID_5 system utilizing a plurality of storage blocks as a processing block, the present invention can reduce the complicated determinations and operations. Supposed the conventional RAID_5 system utilizes 16 sectors as a processing block, when reading out data from or writing data into the upper and lower borders, if the beginning or ending address can not be divided by 16 with no remainder, then the controller has to determine data of which parts in the processing block should be read out or should be written in in order to execute different parity calculations when reading out data from or writing data into the processing block which cannot be divided by 16 with no remainder. This causes complicated determinations and operations. However, the present invention does not need these steps and can simplify the determinations and operations so as to reach higher access efficiency.

Those skilled in the art will readily observe that numerous modifications and alterations of the device and method may be made while retaining the teachings of the invention.

What is claimed is:

1. A RAID_5 (Redundant Array of Independent Disks) controller with data stream distribution and aggregation operations based on a primitive data access block of storage devices, comprising:
   a unit of data distribution and combination;
   an exclusive OR (XOR) operation unit coupled to the unit of data distribution and combination;
   a plurality of transmission controllers, each transmission controller coupled to the XOR operation unit; and
   a plurality of access controllers of the storage devices, each access controller of the storage device coupled to a corresponding transmission controller and a corresponding storage device.

2. The RAID_5 controller of claim 1 further comprising:
   a plurality of data registers, each data register coupled between a corresponding transmission controller and a corresponding access controller of the storage device;
   a controller coupled to the unit of data distribution and combination;
   a command decoder coupled to the controller, the unit of data distribution and combination, the XOR operation unit, and the plurality of transmission controllers; and
   a plurality of flag registers coupled to the command decoder, the unit of data distribution and combination, the XOR operation unit, the plurality of transmission controllers, and the plurality of access controllers of the storage devices.

3. The RAID_5 controller of claim 2 wherein the command decoder decodes a write command or a read command to generate a corresponding control command of a writing procedure or a reading procedure according to stages of the plurality of flag registers.

4. The RAID_5 controller of claim 3 wherein the unit of data distribution and combination distributes a write-in data stream into a plurality of write-in data sub-streams based on the primitive data access block of storage devices as a processing unit for writing according to the stages of the plurality of flag registers and the control command of the writing procedure, and aggregating a plurality of read-out data sub-streams into a read-out data stream based on the primitive data access block of storage devices as a processing unit for reading according to the stages of the plurality of flag registers and the control command of the reading procedure.

5. The RAID_5 controller of claim 3 wherein the XOR operation unit controls the XOR operation according to the stages of the plurality of flag registers in coordination with the control command of the writing procedure or the reading procedure.

6. The RAID_5 controller of claim 3 wherein each transmission controller controls data transmission between the transmission controller and the XOR operation unit according to the stages of the plurality of flag registers in coordination with the control command of the writing procedure or the reading procedure.

7. The RAID_5 controller of claim 3 wherein each access controller of the storage device controls an operation of data writing into or an operation of data reading from the corresponding storage device according to the stages of the plurality of flag registers in coordination with the control command of the writing procedure or the reading procedure.

8. The RAID_5 controller of claim 1 wherein a basic access unit of each access controller of the storage device is the primitive data access block of storage devices.

9. The RAID_5 controller of claim 1 wherein each access controller of the storage device is coupled to the corresponding storage device through a serial ATA (Serial Advanced Technology Attachment, SATA) interface, an USB (Universal Serial Bus) interface, an SAS (Serial Attached Small Computer System Interface, Serial Attached SCSI) interface, an IEEE-1394 interface, or an eSATA interface.

10. A reading method for a RAID_5 system based on an aggregation operation of a primitive data access block of storage devices for reading out a read-out data stream from a plurality of storage devices according to a read command, comprising:
- decoding the read command to generate a corresponding control command of a reading procedure according to stages of a plurality of flag registers;
- executing an operation of data reading corresponding to a plurality of normal storage devices to generate a plurality of read-out data sub-streams according to the control command of the reading procedure and the stages of the plurality of flag registers;
- transmitting the read-out data sub-streams in parallel to an exclusive OR (XOR) operation unit;
- the XOR operation unit controlling XOR operations corresponding to the plurality of read-out data sub-streams, and then transmitting a plurality of processed read-out data sub-streams in parallel to a unit of data distribution and combination according to the control command of the reading procedure and the stages of the plurality of flag registers; and
- the unit of data distribution and combination aggregating the plurality of read-out data sub-streams into the read-out data stream based on the primitive data access block of storage devices as an aggregation unit according to the control command of the reading procedure and the stages of the plurality of flag registers.

11. The reading method of claim 10 further comprising detecting whether there is an invalid storage device according to the stages of the plurality of flag registers before executing the operation of data reading corresponding to the plurality of normal storage devices.

12. The reading method of claim 10 wherein the XOR operation unit controlling the XOR operations corresponding to the plurality of read-out data sub-streams, and then transmitting the plurality of processed read-out data sub-streams in parallel to the unit of data distribution and combination according to the control command of the reading procedure and the stages of the plurality of flag registers comprises when there is an invalid storage device, the XOR operation unit executing the XOR operation to recover a non-parity data stream of the invalid storage device, and transmitting the read-out data sub-streams and the recovered non-parity data stream in parallel to the unit of data distribution and combination.

13. The reading method of claim 10 wherein the XOR operation unit controlling the XOR operations corresponding to the plurality of read-out data sub-streams, and then transmitting the plurality of processed read-out data sub-streams in parallel to the unit of data distribution and combination according to the control command of the reading procedure and the stages of the plurality of flag registers comprises when there is no invalid storage device, the XOR operation unit directly transmitting the read-out data sub-streams in parallel to the unit of data distribution and combination.

14. The reading method of claim 10 wherein the unit of data distribution and combination aggregating the plurality of read-out data sub-streams into the read-out data stream based on the primitive data access block of storage devices as the aggregation unit according to the control command of the reading procedure and the stages of the plurality of flag registers comprises the unit of data distribution and combination aggregating the non-parity data included in the plurality of read-out data sub-streams into the read-out data stream based on the primitive data access block of storage devices as the aggregation unit according to the control command of the reading procedure and the stages of the plurality of flag registers.

15. The reading method of claim 14 wherein aggregating the non-parity data included in the plurality of read-out data sub-streams into the read-out data stream based on the primitive data access block of storage devices as the aggregation unit comprises discarding parity data included in the plurality of read-out data sub-streams.

16. The reading method of claim 10 wherein executing the operation of data reading corresponding to the plurality of normal storage devices to generate the plurality of read-out data sub-streams comprises executing the operation of data reading corresponding to the plurality of normal storage devices to generate the plurality of read-out data sub-streams based on the primitive data access block of normal storage devices as a basic reading unit.

17. A writing method for a RAID_5 system based on an aggregation operation of a primitive data access block of storage devices for writing a write-in data stream into a plurality of storage devices according to a write command, comprising:
- decoding the write command to generate a corresponding control command of a writing procedure according to stages of a plurality of flag registers;
- distributing the write-in data stream into a plurality of write-in data sub-streams based on a primitive data access block of storage devices as a distribution unit by a unit of data distribution and combination according to the control command of the writing procedure and the stages of the plurality of flag registers, and transmitting the plurality of write-in data sub-streams in parallel to an exclusive OR (XOR) operation unit;
- the XOR operation unit controlling XOR operations corresponding to the plurality of write-in data sub-streams, and then transmitting a plurality of processed write-in data sub-streams in parallel to a plurality of access controllers of storage devices corresponding to a plurality of normal storage devices according to the control command of the writing procedure and the stages of the plurality of flag registers; and
- the plurality of access controllers of storage devices writing the plurality of write-in data sub-streams into the plurality of normal storage devices.

18. The writing method of claim 17 further comprising detecting whether there is an invalid storage device according to the stages of the plurality of flag registers before distributing the write-in data stream into the plurality of write-in data sub-streams based on the primitive data access block of storage devices as the distribution unit by the unit of data distribution and combination according to the control command of the writing procedure and the stages of the plurality of flag registers.

19. The method of claim 17 wherein the XOR operation unit controlling the XOR operations corresponding to the plurality of write-in data sub-streams according to the control command of the writing procedure and the stages of the plurality of flag registers comprises when there is an invalid storage device, if there is a non-parity storage block which does not belong to a storage region intended to be written in, disposed on a corresponding upper boundary or a lower boundary of the storage region intended to be written in, and the non-parity storage block belongs to the invalid storage device, executing processes for data recovery to recover data stored in the non-parity storage block, then executing the XOR operation to generate corresponding parity data according to the recovered data stored in the non-parity storage block.

20. The writing method of claim 17 wherein the XOR operation unit controlling the XOR operation corresponding to the plurality of read-out data sub-streams according to the control command of the writing procedure and the stages of the plurality of flag registers comprises when there is an invalid storage device, if there is a non-parity storage block which does not belong to a storage region intended to be written in, disposed on a corresponding upper boundary or a lower boundary of the storage region intended to be written in, and the non-parity storage block does not belong to the invalid storage device, executing a reading procedure to a storage device corresponding to the non-parity storage block to read out data stored in the non-parity storage block, then executing the XOR operation to generate corresponding parity data according to the data stored in the non-parity storage block.

21. The writing method of claim 17 wherein the XOR operation unit controlling the XOR operation corresponding to the plurality of write-in data sub-streams, and transmitting the plurality of processed write-in data sub-streams in parallel to the plurality of access controllers of storage devices corresponding to the plurality of normal storage devices according to the corresponding control command of the writing procedure and the stages of the plurality of flag registers comprises when there is an invalid storage device, if there is a parity storage block which belongs to the invalid storage device, disposed on a corresponding upper boundary of a storage region intended to be written in, determining not to write parity data into the parity storage block, discarding processes to generate the parity data of the parity storage block, and directly transmitting data stored in storage blocks disposed on the upper boundary corresponding to the write-in data sub-streams to the plurality of access controllers of storage devices corresponding to the plurality of normal storage devices in parallel.

22. The writing method of claim 17 wherein the XOR operation unit controlling the XOR operation corresponding to the plurality of write-in data sub-streams, and transmitting the plurality of processed write-in data sub-streams in parallel to the plurality of access controllers of storage devices corresponding to the plurality of normal storage devices according to the corresponding control command of the writing procedure and the stages of the plurality of flag registers comprises when there is an invalid storage device, if there is a parity storage block which belongs to the invalid storage device disposed on a corresponding lower boundary of a storage region intended to be written in, determining not to write parity data into the parity storage block, discarding processes to generate the parity data of the parity storage block, and directly transmitting data stored in storage blocks disposed on the lower boundary corresponding to the write-in data sub-streams to the plurality of access controllers of storage devices corresponding to the plurality of normal storage devices in parallel.

23. The writing method of claim 17 wherein the XOR operation unit controlling the XOR operation corresponding to the plurality of write-in data sub-streams according to the control command of the writing procedure and the stages of the plurality of flag registers comprises when there is no invalid storage device, if there is a non-parity storage block which does not belong to a storage region intended to be written in, disposed on a corresponding upper boundary or a lower boundary of the storage region intended to be written in, executing a reading procedure on a storage device corresponding to the non-parity storage block to read out data stored in the non-parity storage block, then executing the XOR operation to generate corresponding parity data according to the data stored in the non-parity storage block.

24. The writing method of claim 17 wherein the XOR operation unit controlling the XOR operation corresponding to the plurality of write-in data sub-streams according to the control command of the writing procedure and the stages of the plurality of flag registers comprises when there is no invalid storage device, and all storage blocks disposed on a corresponding upper boundary or a lower boundary of a storage region intended to be written in are included in the storage region intended to be written in, executing the XOR operation to generate corresponding parity data directly according to data corresponding to the plurality of write-in data sub-streams.

25. The writing method of claim 17 wherein the XOR operation unit controlling the XOR operation corresponding to the plurality of write-in data sub-streams according to the control command of the writing procedure and the stages of the plurality of flag registers comprises when there is an invalid storage device, and all storage blocks on a corresponding upper boundary or a lower boundary of a storage region intended to be written in are included in the storage region intended to be written in, executing the XOR operation to generate corresponding parity data intended to be written into the valid hard disk according to data corresponding to the plurality of write-in data sub-streams.

26. The writing method of claim 17 wherein the plurality of access controllers of storage devices writing the plurality of write-in data sub-streams into the plurality of normal storage devices is the plurality of access controllers of storage devices writing the plurality of write-in data sub-streams into the plurality of normal storage devices based on the primitive data access block of normal storage devices as a basic writing unit.

* * * * *